(12) United States Patent
Park et al.

(10) Patent No.: US 8,045,430 B2
(45) Date of Patent: Oct. 25, 2011

(54) WRITE-ONCE TYPE OPTICAL DISC, AND METHOD AND APPARATUS FOR MANAGING DEFECTIVE AREAS ON WRITE-ONCE TYPE OPTICAL DISC USING TDMA INFORMATION

(75) Inventors: Yong Cheol Park, Gwachon-si (KR); Sung Dae Kim, Gunpo-si (KR)

(73) Assignee: LG Electronics Inc., Seoul (KR)

( * ) Notice: Subject to any disclaimer, the term of this patent is extended or adjusted under 35 U.S.C. 154(b) by 340 days.

(21) Appl. No.: 12/346,549

(22) Filed: Dec. 30, 2008

(65) Prior Publication Data

US 2009/0116351 A1    May 7, 2009

Related U.S. Application Data

(63) Continuation of application No. 10/670,365, filed on Sep. 26, 2003, now Pat. No. 7,483,349.

(30) Foreign Application Priority Data

Sep. 30, 2002 (KR) .............................. 10-2002-59341
Jan. 11, 2003 (KR) .............................. 10-2003-01859

(51) Int. Cl.
*G11B 7/00* (2006.01)
(52) U.S. Cl. ................ 369/47.14; 369/53.17; 369/53.15
(58) Field of Classification Search ........................ None
See application file for complete search history.

(56) References Cited

U.S. PATENT DOCUMENTS

| | | | |
|---|---|---|---|
| 4,558,446 A | 12/1985 | Banba et al. | |
| 4,733,386 A | 3/1988 | Shimoi et al. | |
| 4,807,205 A | 2/1989 | Picard et al. | |
| 4,963,866 A | 10/1990 | Duncan | |
| 5,051,849 A | 9/1991 | Fukushima et al. | |
| 5,065,388 A | 11/1991 | Roth et al. | |
| 5,068,842 A | 11/1991 | Naito et al. | |
| 5,111,444 A | 5/1992 | Fukushima et al. | |
| 5,210,734 A | 5/1993 | Sakurai et al. | |
| 5,235,585 A | 8/1993 | Bish et al. | |
| 5,237,553 A | 8/1993 | Fukushima et al. | |

(Continued)

FOREIGN PATENT DOCUMENTS

CN       1134017 A       10/1996
(Continued)

OTHER PUBLICATIONS

XP-002289010, ECMA: "ECMA 238 Data interchange on 130mm," Jun. 1996, pp. 54-61.

(Continued)

*Primary Examiner* — Lixi C Simpson
(74) *Attorney, Agent, or Firm* — Birch, Stewart, Kolasch & Birch, LLP

(57) ABSTRACT

A recording medium of writable once type, and a method and apparatus for managing a defective area on the recording medium are provided. The method includes detecting an existence of a defective area within a data area of the recording medium once data are written onto the data area in a data writing operation; writing data written in the defective area onto a spare area of the data area if the defective area is detected; writing temporary management information pertaining to the defective area, onto a temporary management area on the recording medium; and writing access information for accessing the temporary management information, onto a reserved area on the recording medium.

28 Claims, 8 Drawing Sheets

U.S. PATENT DOCUMENTS

| | | | |
|---|---|---|---|
| 5,243,588 A | 9/1993 | Maeda et al. | |
| 5,247,494 A | 9/1993 | Ohno et al. | |
| 5,289,450 A | 2/1994 | Mizumoto et al. | |
| 5,319,626 A * | 6/1994 | Ozaki et al. | 369/53.17 |
| 5,323,367 A | 6/1994 | Tamura et al. | |
| 5,343,456 A | 8/1994 | Maeda | |
| 5,345,433 A | 9/1994 | Ohga et al. | |
| 5,404,357 A | 4/1995 | Ito et al. | |
| 5,408,478 A | 4/1995 | Ohmori et al. | |
| 5,418,762 A | 5/1995 | Kitayama | |
| 5,418,767 A | 5/1995 | Gaudet et al. | |
| 5,426,624 A | 6/1995 | Goto | |
| 5,442,611 A | 8/1995 | Hosaka et al. | |
| 5,448,728 A | 9/1995 | Takano et al. | |
| 5,475,668 A | 12/1995 | Azumatani et al. | |
| 5,475,820 A | 12/1995 | Natrasevschi et al. | |
| 5,481,519 A | 1/1996 | Hosoya et al. | |
| 5,495,466 A | 2/1996 | Dohmeier et al. | |
| 5,497,361 A | 3/1996 | Mita et al. | |
| 5,526,335 A | 6/1996 | Tamegai | |
| 5,528,571 A | 6/1996 | Funahashi et al. | |
| 5,537,373 A | 7/1996 | Horikiri | |
| 5,553,045 A | 9/1996 | Obata et al. | |
| 5,555,537 A | 9/1996 | Imaino et al. | |
| 5,577,194 A | 11/1996 | Wells et al. | |
| 5,608,715 A | 3/1997 | Yokogawa et al. | |
| 5,633,764 A | 5/1997 | Ohta | |
| 5,644,539 A | 7/1997 | Yamagami et al. | |
| 5,666,335 A | 9/1997 | Horibe | |
| 5,666,531 A | 9/1997 | Martin | |
| 5,715,221 A | 2/1998 | Ito et al. | |
| 5,720,030 A | 2/1998 | Kamihara et al. | |
| 5,740,435 A | 4/1998 | Yamamoto et al. | |
| 5,745,444 A | 4/1998 | Ichikawa et al. | |
| 5,799,212 A | 8/1998 | Ohmori et al. | |
| 5,802,028 A | 9/1998 | Igarashi et al. | |
| 5,805,536 A | 9/1998 | Gage et al. | |
| 5,805,547 A | 9/1998 | Yamamuro | |
| 5,820,962 A | 10/1998 | Kimura et al. | |
| 5,825,726 A | 10/1998 | Hwang et al. | |
| 5,848,038 A | 12/1998 | Igarashi et al. | |
| 5,860,088 A | 1/1999 | Benhase et al. | |
| 5,862,117 A | 1/1999 | Fuentes et al. | |
| 5,867,455 A | 2/1999 | Miyamoto et al. | |
| 5,872,750 A | 2/1999 | Satoh | |
| 5,878,020 A | 3/1999 | Takahashi et al. | |
| 5,890,206 A | 3/1999 | Koike | |
| 5,914,928 A | 6/1999 | Takahashi et al. | |
| 5,930,815 A | 7/1999 | Estakhri et al. | |
| 5,940,702 A | 8/1999 | Sakao et al. | |
| 5,940,854 A | 8/1999 | Green, Jr. et al. | |
| 5,966,358 A | 10/1999 | Mine | |
| 6,031,804 A | 2/2000 | Yamamuro | |
| 6,058,085 A | 5/2000 | Obata et al. | |
| 6,089,455 A | 7/2000 | Yagita | |
| 6,118,608 A | 9/2000 | Kakihara et al. | |
| 6,118,737 A | 9/2000 | Hutter | |
| 6,138,203 A | 10/2000 | Inokuchi et al. | |
| 6,160,778 A | 12/2000 | Ito et al. | |
| 6,182,240 B1 | 1/2001 | Mine | |
| 6,189,118 B1 | 2/2001 | Sasaki et al. | |
| 6,205,099 B1 | 3/2001 | Sasaki et al. | |
| 6,208,602 B1 | 3/2001 | Frank | |
| 6,212,647 B1 | 4/2001 | Sims, III et al. | |
| 6,233,654 B1 | 5/2001 | Aoki et al. | |
| 6,246,829 B1 | 6/2001 | Nakagawa | |
| 6,249,884 B1 | 6/2001 | Joo | |
| 6,249,888 B1 | 6/2001 | Sasaki et al. | |
| 6,292,445 B1 | 9/2001 | Ito et al. | |
| 6,301,220 B1 | 10/2001 | Takagi et al. | |
| 6,314,078 B1 | 11/2001 | Takagi et al. | |
| 6,336,202 B1 | 1/2002 | Tsuchimoto et al. | |
| 6,341,109 B1 | 1/2002 | Kayanuma et al. | |
| 6,341,278 B1 | 1/2002 | Yamamoto et al. | |
| 6,373,800 B1 | 4/2002 | Takahashi et al. | |
| 6,393,513 B2 | 5/2002 | Estakhri et al. | |
| 6,405,332 B1 | 6/2002 | Bando et al. | |
| 6,414,923 B1 | 7/2002 | Park et al. | |
| 6,415,350 B2 | 7/2002 | Asoh | |
| 6,418,100 B1 | 7/2002 | Park et al. | |
| 6,447,126 B1 | 9/2002 | Hornbeck | |
| 6,466,532 B1 | 10/2002 | Ko et al. | |
| 6,469,978 B1 | 10/2002 | Ohata et al. | |
| 6,477,126 B1 | 11/2002 | Park et al. | |
| 6,480,446 B1 | 11/2002 | Ko et al. | |
| 6,493,301 B1 | 12/2002 | Park et al. | |
| 6,493,302 B2 | 12/2002 | Takahashi | |
| 6,496,807 B1 | 12/2002 | Inokuchi et al. | |
| 6,529,458 B1 | 3/2003 | Shin et al. | |
| 6,542,450 B1 | 4/2003 | Park et al. | |
| 6,545,833 B1 | 4/2003 | Ee et al. | |
| 6,546,345 B1 | 4/2003 | Ghiasi | |
| 6,564,345 B1 | 5/2003 | Kim et al. | |
| 6,574,419 B1 | 6/2003 | Nonomura et al. | |
| 6,581,167 B1 | 6/2003 | Gotoh et al. | |
| 6,594,725 B2 | 7/2003 | Ando et al. | |
| 6,606,285 B1 | 8/2003 | Ijtsma et al. | |
| 6,615,363 B1 * | 9/2003 | Fukasawa | 714/5 |
| 6,631,106 B1 | 10/2003 | Numata et al. | |
| 6,633,724 B1 | 10/2003 | Hasegawa et al. | |
| 6,667,939 B1 | 12/2003 | Miyamoto et al. | |
| 6,671,243 B2 | 12/2003 | Ando et al. | |
| 6,671,249 B2 | 12/2003 | Horie et al. | |
| 6,697,306 B2 | 2/2004 | Sako et al. | |
| 6,714,502 B2 | 3/2004 | Ko et al. | |
| 6,724,701 B2 | 4/2004 | Ijtsma et al. | |
| 6,724,705 B1 | 4/2004 | Ko et al. | |
| 6,738,341 B2 | 5/2004 | Ohata et al. | |
| 6,748,485 B1 | 6/2004 | Yokota et al. | |
| 6,754,860 B2 | 6/2004 | Kim et al. | |
| 6,760,288 B2 | 7/2004 | Ijtsma et al. | |
| 6,763,429 B1 | 7/2004 | Hirayama et al. | |
| 6,766,418 B1 | 7/2004 | Alexander et al. | |
| 6,782,488 B1 | 8/2004 | Park et al. | |
| 6,785,206 B1 | 8/2004 | Lee et al. | |
| 6,785,219 B1 | 8/2004 | Sasaki et al. | |
| 6,788,631 B1 | 9/2004 | Park et al. | |
| 6,795,389 B1 | 9/2004 | Nishiuchi et al. | |
| RE38,638 E | 10/2004 | Yonemitsu et al. | |
| 6,804,797 B2 | 10/2004 | Ko et al. | |
| 6,826,140 B2 | 11/2004 | Brommer et al. | |
| 6,842,580 B1 | 1/2005 | Ueda et al. | |
| 6,845,069 B2 | 1/2005 | Nakahara et al. | |
| 6,845,072 B1 | 1/2005 | Weirauch | |
| 6,883,111 B2 | 4/2005 | Yoshida et al. | |
| 6,885,623 B2 | 4/2005 | Oishi et al. | |
| 6,892,327 B2 * | 5/2005 | Ko et al. | 714/42 |
| 6,918,003 B2 | 7/2005 | Sasaki et al. | |
| 6,922,802 B2 | 7/2005 | Kim et al. | |
| 6,934,236 B2 | 8/2005 | Lee et al. | |
| 6,957,360 B2 | 10/2005 | Sims, III et al. | |
| 6,999,398 B2 | 2/2006 | Yamamoto et al. | |
| 7,002,882 B2 | 2/2006 | Takahashi et al. | |
| 7,027,059 B2 | 4/2006 | Hux et al. | |
| 7,027,373 B2 | 4/2006 | Ueda et al. | |
| 7,031,239 B2 | 4/2006 | Takahashi et al. | |
| 7,042,825 B2 | 5/2006 | Yamamoto et al. | |
| 7,050,701 B1 | 5/2006 | Sasaki et al. | |
| 7,092,334 B2 | 8/2006 | Choi et al. | |
| 7,123,556 B2 | 10/2006 | Ueda et al. | |
| 7,149,930 B2 | 12/2006 | Ogawa et al. | |
| 7,161,879 B2 | 1/2007 | Hwang et al. | |
| 7,184,377 B2 | 2/2007 | Ito et al. | |
| 7,188,271 B2 | 3/2007 | Park et al. | |
| 7,233,550 B2 | 6/2007 | Park et al. | |
| 7,236,687 B2 | 6/2007 | Kato et al. | |
| 7,248,541 B2 | 7/2007 | Yonezawa | |
| 7,272,086 B2 | 9/2007 | Hwang et al. | |
| 7,283,727 B1 | 10/2007 | Van Gestel | |
| 7,289,404 B2 | 10/2007 | Park et al. | |
| 7,296,178 B2 | 11/2007 | Yoshida et al. | |
| 7,313,066 B2 | 12/2007 | Hwang et al. | |
| 7,317,670 B2 | 1/2008 | Park | |
| 7,327,654 B2 | 2/2008 | Hwang et al. | |
| 7,337,354 B2 | 2/2008 | Yoshida et al. | |
| 7,349,301 B2 | 3/2008 | Terada et al. | |
| 7,355,934 B2 | 4/2008 | Park et al. | |

| | | | | | | |
|---|---|---|---|---|---|---|
| 7,372,788 B2 | 5/2008 | Park et al. | | 2004/0120233 A1 | 6/2004 | Park et al. |
| 7,372,792 B2 | 5/2008 | Park | | 2004/0125716 A1 | 7/2004 | Ko et al. |
| 7,379,402 B2 | 5/2008 | Ko et al. | | 2004/0125717 A1 | 7/2004 | Ko et al. |
| 7,428,202 B2 | 9/2008 | Takahashi et al. | | 2004/0136292 A1 | 7/2004 | Park et al. |
| 7,428,670 B2 | 9/2008 | Hwang et al. | | 2004/0145980 A1 | 7/2004 | Park et al. |
| 7,453,782 B2 | 11/2008 | Takahashi et al. | | 2004/0158768 A1 | 8/2004 | Park et al. |
| 7,483,349 B2 * | 1/2009 | Park et al. ............ 369/47.14 | | 2004/0160799 A1 | 8/2004 | Park et al. |
| 7,483,355 B2 | 1/2009 | Park | | 2004/0165495 A1 | 8/2004 | Park et al. |
| 7,506,109 B2 | 3/2009 | Park | | 2004/0170101 A1 | 9/2004 | Nakajo |
| 7,529,171 B2 | 5/2009 | Ito et al. | | 2004/0174782 A1 | 9/2004 | Lee et al. |
| 7,532,548 B2 | 5/2009 | Park et al. | | 2004/0174785 A1 | 9/2004 | Ueda et al. |
| 7,547,720 B2 | 6/2009 | Doherty et al. | | 2004/0179445 A1 | 9/2004 | Park et al. |
| 7,613,874 B2 | 11/2009 | Park | | 2004/0179455 A1 | 9/2004 | Maruyama et al. |
| 7,672,204 B2 | 3/2010 | Park et al. | | 2004/0179458 A1 | 9/2004 | Hwang et al. |
| 7,742,372 B2 | 6/2010 | Kwon et al. | | 2004/0193946 A1 | 9/2004 | Park et al. |
| 2001/0009537 A1 | 7/2001 | Park | | 2004/0213107 A1 | 10/2004 | Yokokawa |
| 2001/0011267 A1 | 8/2001 | Kihara et al. | | 2004/0223427 A1 | 11/2004 | Kim et al. |
| 2001/0014070 A1 | 8/2001 | Ando et al. | | 2004/0246849 A1 | 12/2004 | Hwang et al. |
| 2001/0020261 A1 | 9/2001 | Ando et al. | | 2004/0246851 A1 | 12/2004 | Hwang et al. |
| 2001/0021144 A1 | 9/2001 | Oshima et al. | | 2004/0246852 A1 | 12/2004 | Hwang et al. |
| 2001/0026511 A1 | 10/2001 | Ueda et al. | | 2004/0257934 A1 | 12/2004 | Gotoh et al. |
| 2001/0033517 A1 | 10/2001 | Ando et al. | | 2005/0007910 A1 | 1/2005 | Ito et al. |
| 2001/0034855 A1 | 10/2001 | Ando et al. | | 2005/0008346 A1 | 1/2005 | Noguchi et al. |
| 2001/0034863 A1 | 10/2001 | Ko et al. | | 2005/0025007 A1 | 2/2005 | Park |
| 2001/0043525 A1 | 11/2001 | Ito et al. | | 2005/0047294 A1 | 3/2005 | Park |
| 2001/0043800 A1 | 11/2001 | Gotoh et al. | | 2005/0050402 A1 | 3/2005 | Koda et al. |
| 2002/0007472 A1 | 1/2002 | Ko et al. | | 2005/0052972 A1 | 3/2005 | Park |
| 2002/0025138 A1 | 2/2002 | Isobe et al. | | 2005/0052973 A1 | 3/2005 | Park |
| 2002/0035705 A1 | 3/2002 | Ando et al. | | 2005/0055500 A1 | 3/2005 | Park |
| 2002/0049938 A1 | 4/2002 | Ko | | 2005/0060489 A1 | 3/2005 | Park |
| 2002/0055012 A1 | 5/2002 | Chou et al. | | 2005/0068877 A1 | 3/2005 | Yeo |
| 2002/0097665 A1 | 7/2002 | Ko et al. | | 2005/0083740 A1 | 4/2005 | Kobayashi |
| 2002/0097666 A1 | 7/2002 | Ko et al. | | 2005/0083767 A1 | 4/2005 | Terada et al. |
| 2002/0099950 A1 | 7/2002 | Smith | | 2005/0083804 A1 | 4/2005 | Hwang et al. |
| 2002/0105868 A1 | 8/2002 | Ko | | 2005/0083830 A1 | 4/2005 | Martens et al. |
| 2002/0133485 A1 | 9/2002 | Furuhashi | | 2005/0111315 A1 | 5/2005 | Hwang et al. |
| 2002/0136118 A1 | 9/2002 | Takahashi | | 2005/0157619 A1 | 7/2005 | Miyawaki et al. |
| 2002/0136134 A1 | 9/2002 | Ito et al. | | 2005/0162989 A1 | 7/2005 | Hwang et al. |
| 2002/0136537 A1 | 9/2002 | Takahashi | | 2005/0195716 A1 | 9/2005 | Ko et al. |
| 2002/0145966 A1 * | 10/2002 | Hirotsune et al. ......... 369/275.3 | | 2005/0207262 A1 | 9/2005 | Terada et al. |
| 2002/0159382 A1 | 10/2002 | Ohata et al. | | 2005/0237875 A1 | 10/2005 | Yamanaka et al. |
| 2002/0161774 A1 | 10/2002 | Tol et al. | | 2005/0289389 A1 | 12/2005 | Yamagami et al. |
| 2002/0163326 A1 | 11/2002 | Choi et al. | | 2006/0039268 A1 | 2/2006 | Yamanaka |
| 2002/0176341 A1 | 11/2002 | Ko et al. | | 2006/0044979 A1 | 3/2006 | Kuraoka et al. |
| 2002/0186341 A1 | 12/2002 | Yamamura et al. | | 2006/0077827 A1 | 4/2006 | Takahashi |
| 2003/0072236 A1 | 4/2003 | Hirotsune et al. | | 2006/0117241 A1 | 6/2006 | Ko et al. |
| 2003/0095482 A1 | 5/2003 | Hung et al. | | 2006/0136134 A1 | 6/2006 | Mihara |
| 2003/0095484 A1 | 5/2003 | Motohashi | | 2006/0195719 A1 | 8/2006 | Ueda et al. |
| 2003/0103427 A1 | 6/2003 | Yeo et al. | | 2006/0203635 A1 | 9/2006 | Ko et al. |
| 2003/0120604 A1 | 6/2003 | Yokota et al. | | 2006/0203638 A1 | 9/2006 | Ko et al. |
| 2003/0126527 A1 | 7/2003 | Kim et al. | | 2006/0203684 A1 | 9/2006 | Ko et al. |
| 2003/0133369 A1 | 7/2003 | Sasaki | | 2006/0227694 A1 | 10/2006 | Woerlee et al. |
| 2003/0135800 A1 | 7/2003 | Kim et al. | | 2006/0233078 A1 | 10/2006 | Terada et al. |
| 2003/0137909 A1 | 7/2003 | Ito et al. | | 2006/0280076 A1 | 12/2006 | Bondijk |
| 2003/0137910 A1 | 7/2003 | Ueda et al. | | 2007/0122124 A1 | 5/2007 | Park et al. |
| 2003/0137913 A1 | 7/2003 | Oshima et al. | | 2007/0211591 A1 | 9/2007 | Park et al. |
| 2003/0142608 A1 | 7/2003 | Yamamoto et al. | | 2007/0294571 A1 | 12/2007 | Park et al. |
| 2003/0149918 A1 | 8/2003 | Takaichi | | 2008/0046780 A1 | 2/2008 | Shibuya et al. |
| 2003/0156471 A1 | 8/2003 | Ueda et al. | | 2008/0273448 A1 | 11/2008 | Nakamura |
| 2003/0161239 A1 | 8/2003 | Yamawaki | | 2008/0279073 A1 | 11/2008 | Gotoh et al. |
| 2003/0173669 A1 | 9/2003 | Shau | | | | |
| 2003/0179669 A1 | 9/2003 | Takahashi et al. | | FOREIGN PATENT DOCUMENTS | | |
| 2003/0198155 A1 | 10/2003 | Go et al. | | | | |
| 2003/0223327 A1 | 12/2003 | Lee et al. | | CN | 1140897 C | 1/1997 |
| 2003/0237024 A1 | 12/2003 | Ogawa et al. | | CN | 1214147 A | 4/1999 |
| 2004/0001408 A1 | 1/2004 | Propps et al. | | CN | 1227950 A | 9/1999 |
| 2004/0004917 A1 | 1/2004 | Lee | | CN | 1246707 A | 3/2000 |
| 2004/0022171 A1 | 2/2004 | Ko | | CN | 1273419 A | 11/2000 |
| 2004/0042363 A1 | 3/2004 | Kobayashi et al. | | CN | 1294385 A | 5/2001 |
| 2004/0047616 A1 | 3/2004 | Uchiumi et al. | | CN | 1304533 A | 7/2001 |
| 2004/0057363 A1 | 3/2004 | Tsukihashi et al. | | CN | 1328327 A | 12/2001 |
| 2004/0062159 A1 | 4/2004 | Park et al. | | CN | 1329334 A | 1/2002 |
| 2004/0062160 A1 | 4/2004 | Park et al. | | CN | 1338102 A | 2/2002 |
| 2004/0073832 A1 | 4/2004 | Ko | | CN | 1342314 A | 3/2002 |
| 2004/0076084 A1 | 4/2004 | Yonezawa | | CN | 1479304 A | 3/2004 |
| 2004/0076096 A1 | 4/2004 | Hwang et al. | | CN | 1662217 A | 8/2005 |
| 2004/0090888 A1 | 5/2004 | Park et al. | | CN | 1675708 A | 9/2005 |
| 2004/0105363 A1 | 6/2004 | Ko et al. | | CN | 1685426 A | 10/2005 |
| 2004/0114474 A1 | 6/2004 | Park et al. | | CN | 1296903 C | 1/2007 |
| | | | | DE | 19954054 | 6/2000 |

| | | | | | | |
|---|---|---|---|---|---|---|
| EP | 0314186 | 5/1989 | | JP | 08-096522 A | 4/1996 |
| EP | 0325823 | 8/1989 | | JP | 08-147702 A | 6/1996 |
| EP | 0350920 | 1/1990 | | JP | 08-273162 A | 10/1996 |
| EP | 0350920 A2 | 1/1990 | | JP | 8/286841 A | 11/1996 |
| EP | 0428208 A2 | 5/1991 | | JP | 8-287595 A | 11/1996 |
| EP | 0464811 | 1/1992 | | JP | 9-63555 A | 3/1997 |
| EP | 0472484 | 2/1992 | | JP | 09-145634 A | 6/1997 |
| EP | 0477503 | 4/1992 | | JP | 09-231053 A | 9/1997 |
| EP | 0 484 555 A1 | 5/1992 | | JP | 9-251721 A | 9/1997 |
| EP | 0556046 | 8/1993 | | JP | 09-270175 A | 10/1997 |
| EP | 0871172 | 10/1998 | | JP | 9-282849 A | 10/1997 |
| EP | 0908882 | 4/1999 | | JP | 9288884 A | 11/1997 |
| EP | 0908882 A2 | 4/1999 | | JP | 09-320204 A | 12/1997 |
| EP | 0957477 A2 | 11/1999 | | JP | 10-49991 A | 2/1998 |
| EP | 0971345 A1 | 1/2000 | | JP | 10-050005 A | 2/1998 |
| EP | 0974967 | 1/2000 | | JP | 10-050032 A | 2/1998 |
| EP | 0989554 | 3/2000 | | JP | 10-187356 A | 7/1998 |
| EP | 0997904 | 5/2000 | | JP | 10-187357 | 7/1998 |
| EP | 1026681 | 8/2000 | | JP | 10-187358 | 7/1998 |
| EP | 1040937 A1 | 10/2000 | | JP | 10-187359 | 7/1998 |
| EP | 1043723 A1 | 10/2000 | | JP | 10-187360 | 7/1998 |
| EP | 1132914 | 9/2001 | | JP | 10-187361 A1 | 7/1998 |
| EP | 1 143 444 A2 | 10/2001 | | JP | 10-199154 A | 7/1998 |
| EP | 1148493 | 10/2001 | | JP | 10-222316 A | 8/1998 |
| EP | 1152402 A1 | 11/2001 | | JP | 10-261286 A | 9/1998 |
| EP | 1152414 | 11/2001 | | JP | 10-289524 A | 10/1998 |
| EP | 1239478 | 9/2002 | | JP | 10-320924 A | 12/1998 |
| EP | 1274081 | 1/2003 | | JP | 11-39801 A | 2/1999 |
| EP | 1298659 | 4/2003 | | JP | 11-66751 A | 3/1999 |
| EP | 1304698 A2 | 4/2003 | | JP | 11-086418 A | 3/1999 |
| EP | 1 313 093 A2 | 5/2003 | | JP | 11-86436 A | 3/1999 |
| EP | 1321940 A1 | 6/2003 | | JP | 11-096684 A | 4/1999 |
| EP | 1329888 | 7/2003 | | JP | 11-110888 A | 4/1999 |
| EP | 1347452 | 9/2003 | | JP | 11-134809 A | 5/1999 |
| EP | 1 547 066 A1 | 6/2005 | | JP | 11-203792 A | 7/1999 |
| EP | 1 548 714 A2 | 6/2005 | | JP | 11306648 A | 11/1999 |
| EP | 1 548 715 A2 | 6/2005 | | JP | 11-353857 A | 12/1999 |
| EP | 1547065 | 6/2005 | | JP | 2000-36161 A | 2/2000 |
| EP | 1 552 510 A1 | 7/2005 | | JP | 2000-40308 A | 2/2000 |
| EP | 1564740 | 8/2005 | | JP | 2000-090588 A | 3/2000 |
| EP | 1 576 603 A2 | 9/2005 | | JP | 2000-105980 A | 4/2000 |
| EP | 1573723 | 9/2005 | | JP | 2000-149449 A | 5/2000 |
| EP | 1 597 722 A1 | 11/2005 | | JP | 2000-195178 A | 7/2000 |
| EP | 1609135 A1 | 12/2005 | | JP | 2000-215612 | 8/2000 |
| EP | 1612790 | 1/2006 | | JP | 2000-215644 A | 8/2000 |
| EP | 1623422 | 2/2006 | | JP | 2000-285607 A | 10/2000 |
| EP | 1652174 | 5/2006 | | JP | 2000-293948 A | 10/2000 |
| EP | 1652175 | 5/2006 | | JP | 2000-293954 A | 10/2000 |
| EP | 1662505 A1 | 5/2006 | | JP | 2000-298954 A | 10/2000 |
| EP | 1 752 976 A2 | 2/2007 | | JP | 2000285000 A | 10/2000 |
| EP | 1 599 869 A1 | 8/2009 | | JP | 2000-322835 A | 11/2000 |
| EP | 1 595 251 B1 | 9/2009 | | JP | 2000-322837 A | 11/2000 |
| GB | 2 332 555 A | 6/1999 | | JP | 2000-322875 A | 11/2000 |
| GB | 2356735 A | 5/2001 | | JP | 2000-322876 A | 11/2000 |
| JP | 945004 C | 3/1979 | | JP | 2000-339874 A | 12/2000 |
| JP | 63-091842 A | 4/1988 | | JP | 2000-348057 A | 12/2000 |
| JP | 64-46280 A | 2/1989 | | JP | 2001-14809 A | 1/2001 |
| JP | 64-79940 A | 3/1989 | | JP | 2001-023317 A | 1/2001 |
| JP | 01-263955 A | 10/1989 | | JP | 2001-069440 A | 3/2001 |
| JP | 2-23417 A | 1/1990 | | JP | 2001-110168 A | 4/2001 |
| JP | 2-54327 A | 2/1990 | | JP | 2001-148166 A | 5/2001 |
| JP | 02-023417 A | 3/1990 | | JP | 2001-167472 A | 6/2001 |
| JP | 02-152072 A | 6/1990 | | JP | 2001-236743 A | 8/2001 |
| JP | 346164 A | 2/1991 | | JP | 2001-266464 A | 9/2001 |
| JP | 4-114371 A | 4/1992 | | JP | 2001-319339 A | 11/2001 |
| JP | 4-172662 A | 6/1992 | | JP | 2001-351334 A | 12/2001 |
| JP | 5-46456 A | 2/1993 | | JP | 2001-357623 A | 12/2001 |
| JP | 05-274814 A | 10/1993 | | JP | 2001-357635 A | 12/2001 |
| JP | 6-20449 A | 1/1994 | | JP | 2001351314 A | 12/2001 |
| JP | 6-223794 A | 8/1994 | | JP | 2002-8247 A | 1/2002 |
| JP | 6-259886 A | 9/1994 | | JP | 2002-015507 A | 1/2002 |
| JP | 6-309802 A | 11/1994 | | JP | 2002-015525 A | 1/2002 |
| JP | 6-338139 A | 12/1994 | | JP | 2002-050131 A | 2/2002 |
| JP | 06-349201 A | 12/1994 | | JP | 2002-056619 A | 2/2002 |
| JP | 729177 A | 1/1995 | | JP | 2002-56620 A | 2/2002 |
| JP | 07-121993 A | 5/1995 | | JP | 2002-109834 A | 4/2002 |
| JP | 7-168749 A | 7/1995 | | JP | 2002117649 A | 4/2002 |
| JP | 220400 A | 8/1995 | | JP | 2002117652 A | 4/2002 |
| JP | 8-50766 A | 2/1996 | | JP | 2002-157832 A | 5/2002 |

| | | | | | | |
|---|---|---|---|---|---|---|
| JP | 2002-170342 A | 6/2002 | KR | 10-2005-0109894 A | 11/2005 |
| JP | 2002-215612 A | 8/2002 | KR | 10-2005-0109895 A | 11/2005 |
| JP | 2002-245723 A | 8/2002 | KR | 100539509 B1 | 2/2006 |
| JP | 2002-288938 A | 10/2002 | KR | 2006-0052789 A | 5/2006 |
| JP | 2002-312940 A | 10/2002 | KR | 10-2010-0072379 A | 6/2010 |
| JP | 2002-324002 A | 11/2002 | RU | 2054203 C1 | 2/1996 |
| JP | 2002-329321 A | 11/2002 | RU | 2174716 C2 | 10/1999 |
| JP | 2002-352522 A | 12/2002 | RU | 2192673 C2 | 11/2002 |
| JP | 2003-30844 A | 1/2003 | RU | 2208844 C2 | 7/2003 |
| JP | 2003-030844 A | 1/2003 | RU | 2 223 556 C2 | 2/2004 |
| JP | 2003-505813 A | 2/2003 | RU | 2005103626 | 9/2005 |
| JP | 2003-85882 A | 3/2003 | RU | 2005127337 | 2/2006 |
| JP | 2003-91938 A | 3/2003 | RU | 2 337 416 C2 | 10/2008 |
| JP | 2003-510742 | 3/2003 | TW | 283232 A | 8/1996 |
| JP | 2003151216 A | 5/2003 | TW | 302475 A | 4/1997 |
| JP | 2003-208759 A | 7/2003 | TW | 371752 A | 10/1999 |
| JP | 2003-228962 A | 8/2003 | TW | 486913 | 3/2000 |
| JP | 2003-249029 A | 9/2003 | TW | 508592 | 10/2000 |
| JP | 2003-264800 A | 9/2003 | TW | 413805 | 12/2000 |
| JP | 2003-335062 A | 11/2003 | TW | 413806 | 12/2000 |
| JP | 2003-536194 A | 12/2003 | TW | 434476 | 5/2001 |
| JP | 2004-79087 A | 3/2004 | TW | 452770 | 9/2001 |
| JP | 2004-95057 A | 3/2004 | TW | 484119 | 4/2002 |
| JP | 2004-118910 A | 4/2004 | TW | 490871 | 6/2002 |
| JP | 2004-171714 A | 6/2004 | TW | 495750 B | 7/2002 |
| JP | 2004-213753 A | 7/2004 | TW | 509890 | 11/2002 |
| JP | 2004-213769 A | 7/2004 | TW | 518573 | 1/2003 |
| JP | 2004-213774 A | 7/2004 | TW | 200401275 B | 2/2004 |
| JP | 2004-527436 B | 9/2004 | TW | 200402045 B | 2/2004 |
| JP | 2004-280864 A | 10/2004 | TW | 200403663 B | 3/2004 |
| JP | 2004-280865 A | 10/2004 | WO | WO-84/00628 A1 | 2/1984 |
| JP | 2004-303381 A | 10/2004 | WO | WO-96/30902 A1 | 10/1996 |
| JP | 2004280866 | 10/2004 | WO | WO 97/07505 A1 | 2/1997 |
| JP | 2005-004912 A | 1/2005 | WO | WO-97/22182 A1 | 6/1997 |
| JP | 2005044495 A | 1/2005 | WO | WO-97/36296 A1 | 10/1997 |
| JP | 2005-32374 A | 2/2005 | WO | WO-00/07185 A1 | 2/2000 |
| JP | 2005-56542 A | 3/2005 | WO | WO 0007300 A1 | 2/2000 |
| JP | 2005-166096 A | 6/2005 | WO | WO 00/19432 A1 | 4/2000 |
| JP | 2005-174528 A | 6/2005 | WO | WO 00/54158 A1 | 9/2000 |
| JP | 2005-196903 A | 7/2005 | WO | WO 00/54274 A1 | 9/2000 |
| JP | 2005-535993 A | 11/2005 | WO | WO-00/54274 A1 | 9/2000 |
| JP | 2005-538490 A | 12/2005 | WO | WO-01/06512 A1 | 1/2001 |
| JP | 2005-538491 A | 12/2005 | WO | WO-01/22416 A1 | 3/2001 |
| JP | 2005339773 A | 12/2005 | WO | WO 01/22416 A1 | 3/2001 |
| JP | 2006-500724 A | 1/2006 | WO | WO-01/24179 A1 | 4/2001 |
| JP | 2006-503396 A | 1/2006 | WO | WO-01/35408 A1 | 5/2001 |
| JP | 2006-85859 A | 3/2006 | WO | WO-01/75879 A1 | 10/2001 |
| JP | 2006-512699 A | 4/2006 | WO | WO-01/93035 A2 | 12/2001 |
| JP | 2006-513519 T | 4/2006 | WO | WO 01/95330 A2 | 12/2001 |
| JP | 2006-518533 A | 8/2006 | WO | WO-01/95330 A2 | 12/2001 |
| JP | 2006-519445 A | 8/2006 | WO | WO 02/057195 A1 | 7/2002 |
| JP | 2006-520064 T | 8/2006 | WO | WO-02/086888 A2 | 10/2002 |
| JP | 2007-501488 A | 1/2007 | WO | WO 02086887 A1 | 10/2002 |
| JP | 2007-502512 A | 2/2007 | WO | WO-03/007296 A1 | 1/2003 |
| JP | 2007066515 A | 3/2007 | WO | WO-03/025924 A1 | 3/2003 |
| JP | 2008-511095 A | 4/2008 | WO | WO-03/030173 A2 | 4/2003 |
| JP | 2008-112577 A | 5/2008 | WO | WO-03/063165 A1 | 7/2003 |
| JP | 2008-282532 A | 11/2008 | WO | WO-03/079353 A1 | 9/2003 |
| JP | 2009/203493 A | 9/2009 | WO | WO 03/105138 A1 | 12/2003 |
| JP | 2009-283131 A | 12/2009 | WO | WO 03/105141 A1 | 12/2003 |
| JP | 4532487 B2 | 6/2010 | WO | WO 03105152 A1 | 12/2003 |
| KR | 2003-0018533 A | 4/2000 | WO | WO-2004/015707 A1 | 2/2004 |
| KR | 10-0606663 B1 | 5/2000 | WO | WO-2004/015708 A1 | 2/2004 |
| KR | 10-2000-0032046 A | 6/2000 | WO | WO 2004/019331 A1 | 3/2004 |
| KR | 2000-0033285 A | 6/2000 | WO | WO-2004/025648 A1 | 3/2004 |
| KR | 10-20020007298 A | 1/2002 | WO | WO 2004/025648 A1 | 3/2004 |
| KR | 10-20020081411 A | 10/2002 | WO | WO-2004/025649 A1 | 3/2004 |
| KR | 1020030067650 A | 8/2003 | WO | WO 2004/027775 A1 | 4/2004 |
| KR | 10-20040009358 A | 1/2004 | WO | WO-2004/029668 A2 | 4/2004 |
| KR | 10-2004-0015424 A | 2/2004 | WO | WO-2004/029941 A1 | 4/2004 |
| KR | 1020040015602 A | 2/2004 | WO | WO-2004/029942 A1 | 4/2004 |
| KR | 10-2004-0023127 A | 3/2004 | WO | WO 2004/029942 A1 | 4/2004 |
| KR | WO 2004-0023126 A | 3/2004 | WO | WO-2004/029968 A2 | 4/2004 |
| KR | 10-20040032674 A | 4/2004 | WO | WO-2004/034396 A1 | 4/2004 |
| KR | 2004-0065004 A | 7/2004 | WO | WO 2004/034396 A1 | 4/2004 |
| KR | 1020040094301 A | 11/2004 | WO | WO-2004/036561 A1 | 4/2004 |
| KR | 2004-100702 A | 12/2004 | WO | WO-2004/053872 A1 | 6/2004 |
| KR | 10-2005-0057396 A | 6/2005 | WO | WO-2004/053874 A1 | 6/2004 |
| KR | 2005-0085444 A | 8/2005 | WO | WO-2004/059648 A2 | 7/2004 |

| | | | |
|---|---|---|---|
| WO | WO 2004/064064 A1 | 7/2004 |
| WO | WO 2004/068476 A1 | 8/2004 |
| WO | WO-2004/068476 A1 | 8/2004 |
| WO | WO 2004/068477 A1 | 8/2004 |
| WO | WO 2004/072963 A1 | 8/2004 |
| WO | WO-2004/075180 A1 | 9/2004 |
| WO | WO-2004/077415 A1 | 9/2004 |
| WO | WO 2004/077420 A1 | 9/2004 |
| WO | WO 2004/077432 A1 | 9/2004 |
| WO | WO-2004/079631 A2 | 9/2004 |
| WO | WO 2004/079729 A1 | 9/2004 |
| WO | WO-2004/079729 A1 | 9/2004 |
| WO | WO-2004/079731 | 9/2004 |
| WO | WO-2004/079740 A1 | 9/2004 |
| WO | WO-2004/081922 A1 | 9/2004 |
| WO | WO-2004/081926 A1 | 9/2004 |
| WO | WO-2004/086379 A1 | 10/2004 |
| WO | WO 2004/090890 A1 | 10/2004 |
| WO | WO-2004/093035 A1 | 10/2004 |
| WO | WO-2004/100155 A1 | 11/2004 |
| WO | WO 2004/100155 A1 | 11/2004 |
| WO | WO-2004/100156 A1 | 11/2004 |
| WO | WO 2004/105024 A1 | 12/2004 |
| WO | WO-2005/004123 A1 | 1/2005 |
| WO | WO-2005/004154 | 1/2005 |
| WO | WO 2005/004154 A2 | 1/2005 |
| WO | WO 2005/006314 A1 | 1/2005 |
| WO | WO 2005/006315 A1 | 1/2005 |
| WO | WO 2005/006316 A1 | 1/2005 |
| WO | WO 2005/013265 A1 | 2/2005 |
| WO | WO 2005/013266 A1 | 2/2005 |
| WO | WO-2005/024792 A2 | 3/2005 |
| WO | WO-2005/062306 A1 | 7/2005 |
| WO | WO-2005/073971 A2 | 8/2005 |
| WO | WO 2005109432 A1 | 11/2005 |
| WO | WO 2005/124768 A1 | 12/2005 |
| WO | WO 2005/124774 A1 | 12/2005 |
| WO | WO 2006/080572 A1 | 8/2006 |

OTHER PUBLICATIONS

English language abstract for JP-2006-500707-T (Jan. 5, 2006).
English language abstract for JP-2006-501590-T (Jan. 12, 2006).
English language abstract for JP-2006-502520-T (Jan. 19, 2006).
English language abstract for JP-2006-514389-T (Apr. 27, 2006).
English language abstract for JP-2006-518533-T (Aug. 10, 2006).
English language abstract for JP-2006-519455-T (Aug. 24, 2006).
English language abstract for JP-2006-522991-T (Oct. 5, 2006).
English language abstract for TW-448435-B (Aug. 1, 2001).
English language abstract for TW-470946-B (Jan. 1, 2002).
English language abstract for TW-497098-B (Aug. 1, 2002).
JIS handbook data processing for hardware, Japan, Japanese Standards Association Inc., Apr. 21, 1999, pp. 1064-1070.
Yokozeki et al., "A Virtual Optical Disk Method to Realize Rewritability and Revision Control on a Write-Once Optical Disk", Systems and Computers in Japan, vol. 21, No. 8, (1990) XP000177819.
ECMA: "120mm DVD Rewritable Disk (DVD-RAM)" Internet Citation Feb. 1, 1998, pp. 43-55, XP002518235.
ECMA: Standardizing Information and Communication Systems: Standard ECMA-240: Data Interchange on 120mm Optical Disk Cartridges using Phase Change PD Format—Capacity:650Mbytes per Cartridge Standard ECMA 240, Jun. 1, 1996, pp. 41-53, XP002562014.
English-language abstract for RU-2006-127439-A.
Parlante, "Linked List Basics", Document No. 103, Apr. 12, 2001, pp. 1-26, http://cslibrary.stanford.edu/103/LinkedListBasics.pdf.
Japanese Office Action dated Mar. 1, 2011 issued in corresponding JP Application No. 2010-023359.

* cited by examiner

WRITE-ONCE TYPE OPTICAL DISC, AND METHOD AND APPARATUS FOR MANAGING DEFECTIVE AREAS ON WRITE-ONCE TYPE OPTICAL DISC USING TDMA INFORMATION

This application is a Continuation of application Ser. No. 10/670,365, filed on Sep. 26, 2003 now U.S. Pat. No. 7,483,349, and for which priority is claimed under 35 U.S.C. §120: and this application claims priority of Application Nos. P2002-059341 filed on Sep. 30, 2002, and P2003-001859 filed on Jan. 11, 2003. The entire contents of each of these applications are herein fully incorporated by reference.

BACKGROUND OF THE INVENTION

1. Field of the Invention

The present invention relates to an optical disc of write-once type, such as a Blu-ray Disc Write Once (BD-WO), and a method and apparatus for managing a defective area on the write-once type optical disc.

2. Background of the Related Art

A new type of high density optical disc such as a Blu-ray Disc Rewritable (BD-RE) is being developed. A benefit of the BD-RE is that it has a rewritable capability where the quality video and audio data can be written, erased and rewritten thereon repeatedly.

FIG. 1 is a block diagram of a general optical disc device for writing/reproducing data to/from an optical disc such as a BD-RE. As shown in FIG. 1, the optical disc device includes an optical pickup 11 for recording/reproducing a signal to/from a BD-RE 10, a video disc recorder (VDR) system 12 for processing a signal from the optical pickup 11 as a reproduced signal, or demodulating and processing an external data stream into a writable signal suitable for writing onto the BD-RE 10, and an encoder 13 for encoding an external analog signal and providing the encoded signal to the VDR system 12.

FIG. 2 shows a structure of a related art BD-RE. Referring to FIG. 2, the BD-RE is divided into a Lead-In Area (LIA), a data area, and a Lead-Out area (LOA), with an Inner Spare Area (ISA) and an Outer Spare Area (OSA) assigned to a fore end and a rear end of the data area.

Referring to FIGS. 1 and 2, the VDR system 12 of the optical disc device writes in the data area of the BD-RE the external data in clusters corresponding to an ECC block unit having a predetermined size of recording, after the VDR system 12 encodes and demodulates the external signal into a signal suitable for writing. During the writing process, if there is a defective area found in the data area of the BD-RE, the VDR system 12 carries out a series of replacement writing operations in which the clusters of data written onto the defective area is written onto one of the spare areas, e.g., on the ISA in place of the defective area. Therefore, even if there is a defective area in the data area of the BD-RE, the VDR system 12 can prevent a data writing error in advance by writing the clusters of data written in the defective area onto the spare area.

A Blu-ray Disc Write-Once (BD-WO) is another type of high density optical disc that is being developed where a high quality of data can be recorded and reproduced to/from the disc. As the name may suggest, data can be written only once on the BD-WO and is not rewritable on the BD-WO, but the BD-WO can be read repeatedly. As a result, the BD-WO is useful where the rewritability of data on a recording medium is not desired.

Unfortunately, since the BD-WO is still in the early development stage, there are no schemes, no disc structures, no apparatuses and no methods on how to manage the defective areas of the BD-WO, which will be needed for the BD-WO to be commercially viable and operationally feasible.

SUMMARY OF THE INVENTION

Accordingly, the present invention is directed to a technique for managing a defective area on an optical disc of write-once type such as a BD-WO.

An object of the present invention is to provide a write-once type optical disc, and an apparatus and method for effectively managing a defective area of the write-once type optical disc.

Additional features and advantages of the invention will be set forth in the description which follows, and in part will be apparent to those having ordinary skill in the art upon examination of the following or may be learned from practice of the invention. The objectives and other advantages of the invention will be realized and attained by the structure particularly pointed out in the written description and claims hereof as well as the appended drawings.

In accordance with an aspect of the invention, a method for managing a defective area on a recording medium of writable once type, the recording medium including a data area, the data area having a spare area, comprises detecting an existence of a defective area within the data area of the recording medium once data are written onto the data area in a data writing operation; writing data written in the defective area onto the spare area if the defective area is detected; writing temporary management information pertaining to the defective area, onto a temporary management area on the recording medium; and writing access information for accessing the temporary management information, onto a reserved area on the recording medium.

In accordance with another aspect of the invention, a method for managing a defective area on a recording medium of writable once type, the recording medium including a data area, the data area having a spare area, comprises writing data written in the defective area onto the spare area if the defective area is detected; writing temporary management information pertaining to the defective area, onto a temporary management area on the recording medium; writing access information for accessing the temporary management information, onto a reserved area on the recording medium; and transferring, at finalization of a data writing operation on the recording medium, the temporary management information and the access information as defect management area (DMA) information into another area on the recording medium.

In accordance with another aspect of the invention, an apparatus for managing a defective area on a recording medium of writable once type, the recording medium including a data area, the data area having a spare area, the comprises a combination of components for (a) detecting an existence of a defective area within the data area of the recording medium once data are written onto the data area in a data writing operation, (b) writing data written in the defective area onto the spare area if the defective area is detected, (c) writing temporary management information pertaining to the defective area, onto a temporary management area on the recording medium, and (d) writing access information for accessing the temporary management information, onto a reserved area on the recording medium.

In accordance with another aspect of the invention, an apparatus for managing a defective area on a recording medium of writable once type, the recording medium including a data area, the data area having a spare area, comprises a combination of components for (a) writing data written in the defective area onto the spare area if the defective area is detected, (b) writing temporary management information pertaining to the defective area, onto a temporary management area on the recording medium, (c) writing access information for accessing the temporary management information, onto a reserved area on the recording medium, and (d) transferring, at finalization of a data writing operation on the recording medium, the temporary management information and the access information as defect management area (DMA) information into another area on the recording medium.

In accordance with another aspect of the invention, a recording medium of writable once type, comprises at least one recording layer including a data area, the data area having a spare area, wherein an existence of a defective area within the data area of the recording medium is detected once data are written onto the data area in a data writing operation, data written in the defective area is written onto the spare area if the defective area is detected, temporary management information pertaining to the defective area is written onto a temporary management area on the recording medium, and access information for accessing the temporary management information is written onto a reserved area on the recording medium.

In accordance with another aspect of the invention, a recording medium of writable once type, comprises at least one recording layer including a data area and an area outside of the data area, the data area having a spare area, wherein data written in a defective area of the data area is written onto the spare area if the defective area is detected, temporary management information pertaining to the defective area is written onto a temporary management area on the recording medium, access information for accessing the temporary management information is written onto a reserved area on the recording medium, and at finalization of a data writing operation on the recording medium, the temporary management information and the access information are transferred into the area outside of the data area as defect management area (DMA) information.

It is to be understood that both the foregoing description and the following detailed description of the present invention are exemplary and explanatory and are intended to provide further explanation of the invention claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 3:
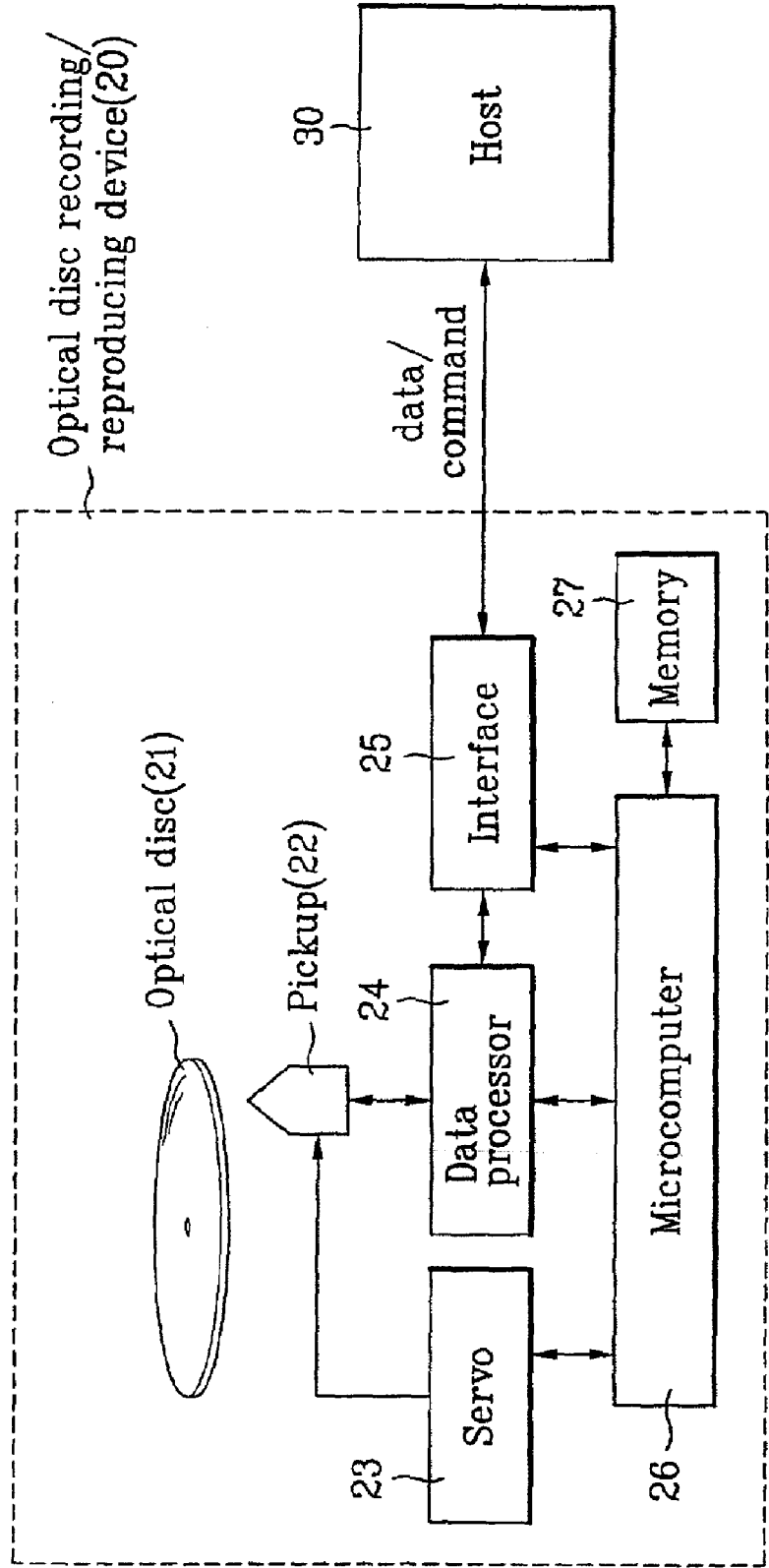
FIG. 3 illustrates a block diagram of an optical disc recording/reproducing device according to the present invention.

FIG. 3 is an example of a block diagram of an optical disc recording/reproducing device 20 according to an embodiment of the present invention. The optical disc recording/reproducing device 20 includes an optical pickup 22 for writing/reading data to/from an optical recording medium 21, a servo unit 23 for controlling the pickup 22 to maintain a distance between an objective lens of the pickup 22 and the recording medium 21 and for tracking relevant tracks on the recording medium 21, a data processor 24 for processing and supplying input data to the pickup 22 for writing, and for processing data read from the recording medium 21, an interface 25 for exchanging data and/or commands with any external host 30, a memory or storage 27 for storing information and data therein including defect management data (e.g., temporary management information, etc.) associated with the recording medium 21, and a microprocessor or controller 26 for controlling the operations and elements of the recording/reproducing device 20. Data to be written/read to/from the recording medium 21 may also be stored in the memory 27. All the components of the recording/reproducing device 20 are operatively coupled.

The recording medium 21 is a recording medium of write-once type such as a BD-WO.

Figure 4:
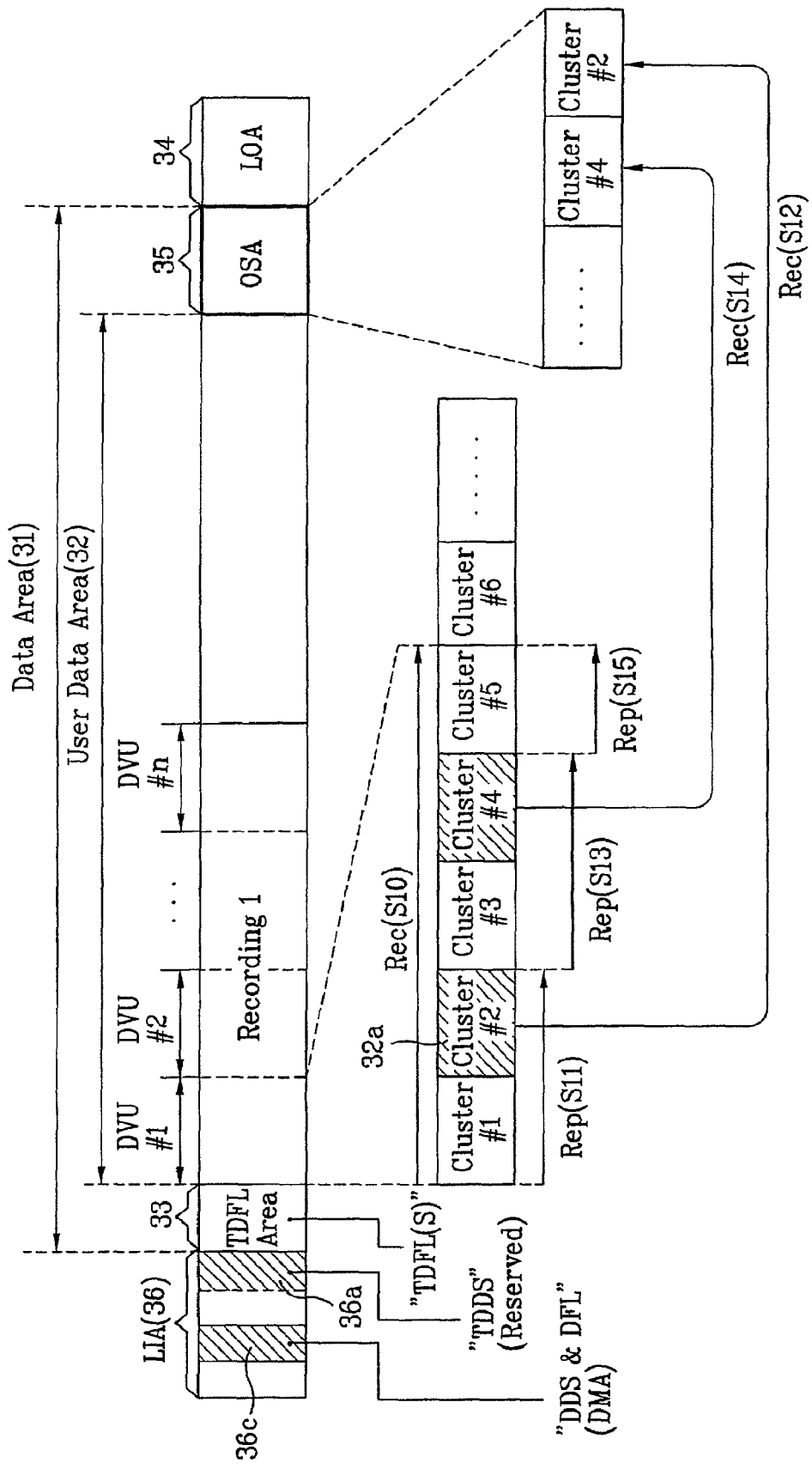
FIG. 4 illustrates a structure of a BD-WO and a diagram illustrating a method for managing a defective area on the BD-WO in accordance with a preferred embodiment of the present invention.

FIG. 4 illustrates a structure of a BD-WO and a method for managing a defective area on the BD-WO in accordance with a preferred embodiment of the present invention.

Referring to FIG. 4, for example, the BD-WO includes a lead-in area (LIA) 36, a data area 31, and a lead-out area (LOA) 34. The data area 31 includes a user data area 32 assigned with physical sector numbers (PSN) and logical sector numbers (LSN), and non-user data areas having only the physical sector numbers assigned thereto.

The non-user data areas include an outer spare area (OSA) 35 for writing data in place of a defective area of the user data area 32, and a Temporary Defect List (TDFL) area 33 for writing temporary management information pertaining to the defective areas of the user data area 32 and to the spare area(s) replacing the defective areas.

The data area 31 may further include an inner spare area (ISA) (not shown) at a front part of the data area 31 in addition to or in lieu of the OSA 35. The TDFL area may be located at a position adjacent to the OSA in lieu of the TDFL area 33 or in addition to the TDFL area 33.

The LIA 36 includes a Defect Management Area (DMA) 36c at any part of the LIA 36, and a Temporary Disc Definition Structure (TDDS) area 36a at any part of the LIA 36. The TDDS area 36a stores therein TDDS information. The DMA 36c stores therein DMA information including Disc Definition Structure (DDS) information and Defect List (DFL) information. The TDDS information, DDS information and DFL information will be discussed later in more detail.

The BD-WO can have one or two recording layers. A BD-WO having only a single recording layer (Layer 0) may include a single recording layer composed of a lead-in area (LIA), a data area, and a lead-out area (LOA), and is referred to herein as a single layer disc. A BD-WO having two recording layers (Layers 0 and 1) may include two recording layers each composed of a data area and a LIA (or LOA), and is referred to herein as a dual layer disc. The single layer disc can have a capacity of 23.3, 25.0 or 27.0 Gbytes, whereas the dual layer disc can have a capacity of 46.6, 50.0, or 54.0 Gbytes.

Figure 1:
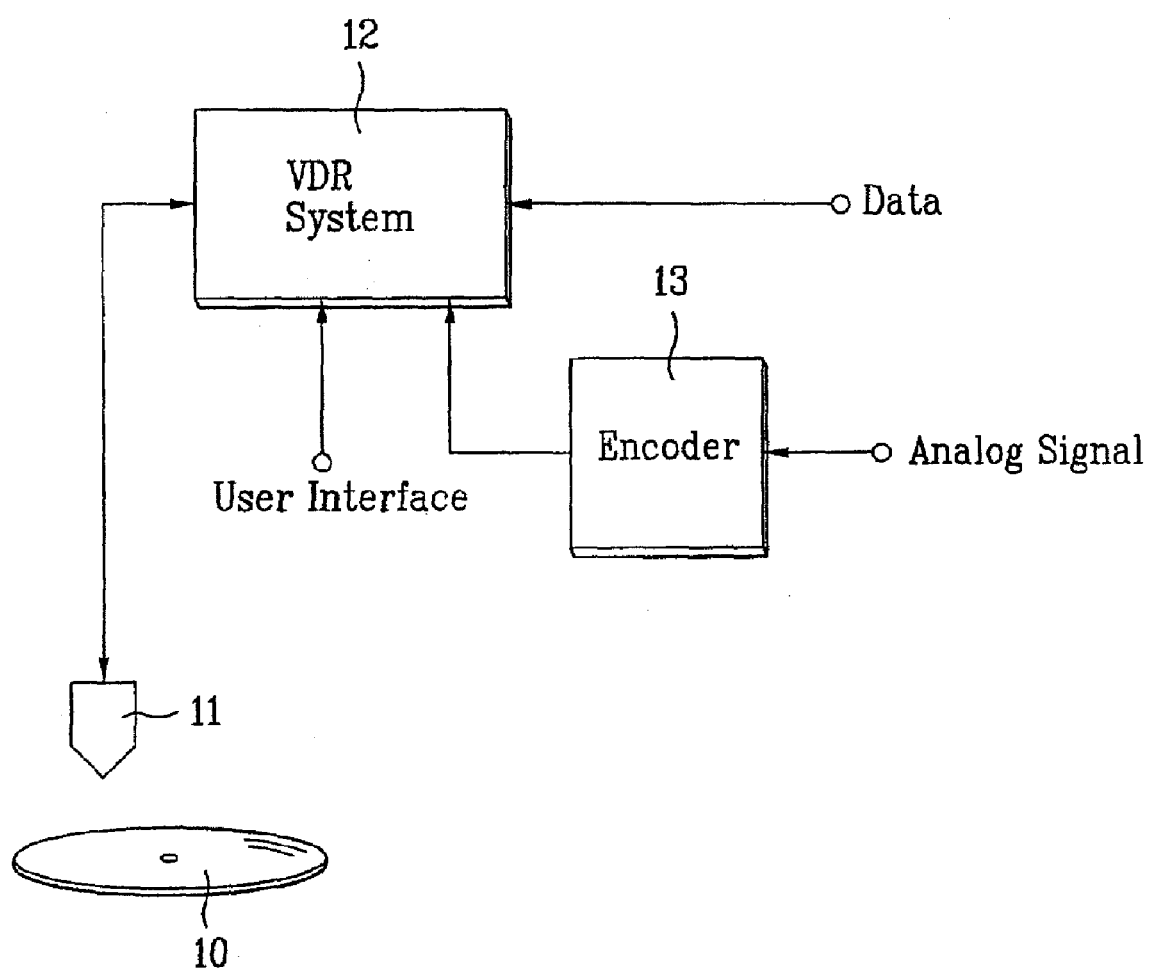
FIG. 1 illustrates a related art optical disc device schematically.
Figure 2:
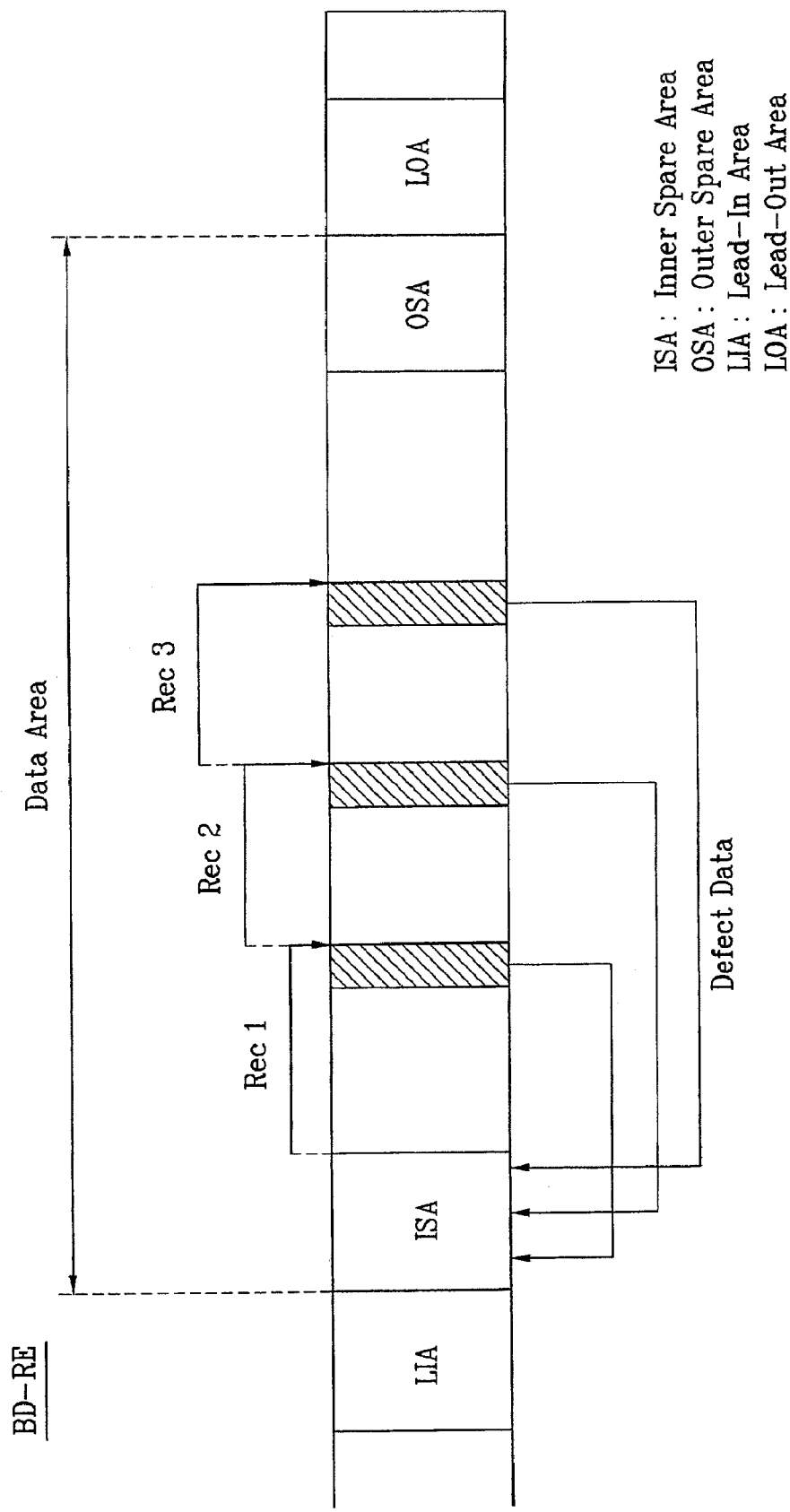
FIG. 2 illustrates a structure of a related art BD-RE.

It should be noted that all the different embodiments of the present invention (e.g., various methods discussed herein) are applicable to any type of a write-once optical disc, such as a single layer BD-WO or a dual layer BD-WO. Further, although the use of the recording/reproducing device 20 of FIG. 3 is discussed below in conjunction with the methods of the invention, the invention is not limited to such and encompasses other recording/reproducing devices as long as they are configured to implement the present methods. For instance, the device shown in FIG. 1 may be used to implement the present methods as needed.

Referring to FIGS. 3 and 4, the optical disc recording/reproducing device 20 writes data continuously on a predetermined writing sector in the user data area 32 of the BD-WO, where a writing sector may be set to be a Defect Verify Unit (DVU) of a certain recording size equivalent to one or more than one physical track or cluster on the BD-WO.

After continuously writing the data on the DVUs for a set of data (e.g. Recording 1), the microcomputer 26 controls the pickup 22 to conduct a series of defective area detecting operations on the Recording 1 area of the BD-WO. A defective area detecting operation involves reproducing the data written in a DVU and verifying that the data was properly written on the DVU by, e.g., comparing the actual data reproduced from the DVU with the data that was meant to be written on the DVU. If the verification result indicates that certain data was not properly recorded on a DVU, then the recording/reproducing device 20 assumes that there is a defective area in that DVU of the BD-WO and rewrites the data (directed to the defective DVU) onto a spare area (e.g., OSA 35) using a linear replacement scheme.

For example, after writing first to fifth clusters of data (Clusters #1~#5) continuously as a first defect verify unit DVU #1 (step S10), the microcomputer 26 controls the pickup 22 to reproduce the data written on DVU #1 progressively (e.g., cluster by cluster), and detects if there is any defective area in DVU #1 by examining the reproduced data. If, for example, a defect is detected in the second cluster Cluster #2 (step S11) at the cluster area 32a where Cluster #2 is written, the microcomputer 26 controls the data processor 24 and the pickup 22 to carry out a replacement writing operation. In the replacement writing operation, the data written to the Cluster #2 area 32a, which may be temporarily stored in the memory 27 or some other storage, are written onto a cluster/replacement area within the OSA 35 (step S12). In this instance, Cluster #2 data may be written in the OSA 35 starting from either the rear end or the fore end of the OSA 35.

After the replacement writing for Cluster #2 is completed, the recording/reproducing device 20 checks the next cluster and so on until the last cluster in that DVU is checked. If, for example, a defective area is detected from the fourth cluster Cluster #4 (S13), the recording/reproducing device 20 carries out a replacement writing operation as discussed above to write the data written in the defective Cluster #4 area onto a next available area within the OSA 35, e.g., an area adjacent to the replacement area for Cluster #2 (step S14).

The replacement writing operations continue until data on all the defective clusters in the DVU are written in replacement areas such as spare areas. As a result, in this example, DVU #1 ends up having Clusters #1, #3, and #5 and two defective areas (original Clusters #2 and #4), where the replacement areas (OSA 35) are used to write data thereon in lieu of the two defective areas using a linear replacement scheme.

Once the data recording (Recording 1) having a temporal continuity ends (which includes the data write operations, the defective area detecting operations and replacement writing operations for DVU #1, DVU #2, . . . , DVU #n), the microcomputer 26 writes temporary management information in the form of TDFL information onto the TDFL area 33. In the alternative, when the data recording (e.g., Recording 1) having a temporal continuity ends in the middle of writing the data written in the defective area onto the OSA 35 during the replacement writing operation, the microcomputer 26 may write defect entries onto the TDFL area 33 as TDFL information at that point, and then update the TDFL information as needed subsequently.

Figure 5:
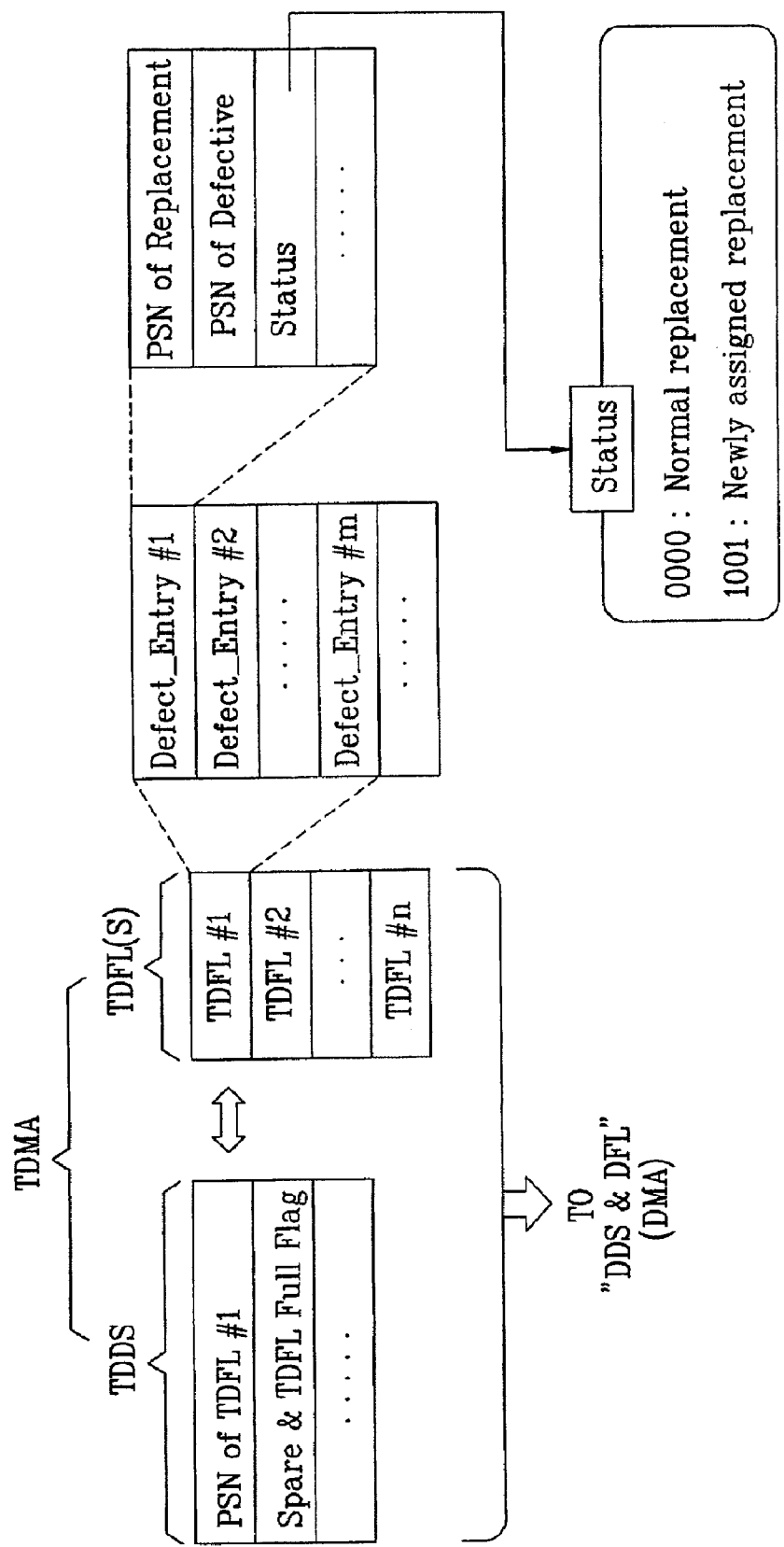
FIGS. 5 and 6 illustrate diagrams each showing management information produced and written according to the method of FIG. 4.

The temporary management information is used to manage the defective areas in the data area 31 of the BD-WO and to manage the data written in the replacement areas corresponding to the defective areas. The temporary management information may be managed as, e.g., TDFL information containing one or more TDFLs. FIG. 5 shows a structure of TDFL information according to an embodiment of the invention.

As shown in FIG. 5, the TDFL information includes one or a plurality of TDFLs (TDFL #1~TDFL #n). Each TDFL may include one or a plurality of defect entries Defect_Entry #1-Defect_Entry #m. Each defect entry has a first physical sector number of a corresponding defective area (PSN of Defective), a first physical sector number of a replacement area corresponding to that defective area (PSN of Replacement), status information (Status), and any other data pertaining to a defect entry. That is, the PSN of Defective is a physical sector number of a starting point of a cluster area containing the defect. Similarly, the PSN of Replacement is a physical sector number of a starting point of a replacement area for replacing the defective cluster area.

As an example only, if the status information (Status) is 'Status=0000', this status information indicates that the management information written in the corresponding defect entry is a first-time management information on the data written in lieu of the defective area detected at the time of data writing operation. That is, it indicates that there is no defect in the replacement area (e.g., in the OSA 35) corresponding to the defective area. On the other hand, if the status information is 'Status=1001', this status information indicates that the management information written in the corresponding defect entry is not the first-time management information, but is a second-time management information. That is, it indicates that there was a defect in the first replacement area (e.g., in the OSA 35) corresponding to the defective area and the current management information pertains to a new, second replacement area (e.g., in the OSA 35) that replaces the first defective replacement area in the OSA 35.

Once the writing of the TDFL information (e.g., TDFL #1) for Recording 1 is completed, the recording/reproducing device 20 may continue with another data writing operation (e.g., Recording 2) having a temporal continuity. When the data writing operation (Recording 2) ends (which includes the defective area detecting operations and the replacement writing operations for all the DVUs of Recording 2 as discussed above), the temporary management information for Recording 2 may be written onto the TDFL area 33. This process may be repeated as long as all the data to be written in the data area of the BD-WO are properly written.

For fast access to the TDFL information written thus far, the microcomputer 26 may be configured to write fast access information in other part(s) of the BD-WO. The fast access information may be, e.g., Temporary Disc Definition Structure (TDDS) information and may be written in a reserved area 36*a* of the LIA 36 (FIG. 4).

As shown in FIG. 5, for instance, the TDDS information includes one or more physical sector numbers (e.g., PSN of TDFL #1) each indicating a location of a TDFL written in the TDFL area 33, flag information (e.g., Spare & TDFL Full Flag) for indicating whether or not the OSA area 35 and/or the TDFL area 33 is full, and any other information pertaining to the TDFL information. Here, a single flag may be used to indicate whether both the OSA area 35 and the TDFL area 33 are full, or multiple flags may be used to indicate whether the OSA area 35 and/or the TDFL area 33 is full. Temporary Defect Management Area (TDMA) information includes the TDDS information and the TDFL information.

Figure 6:
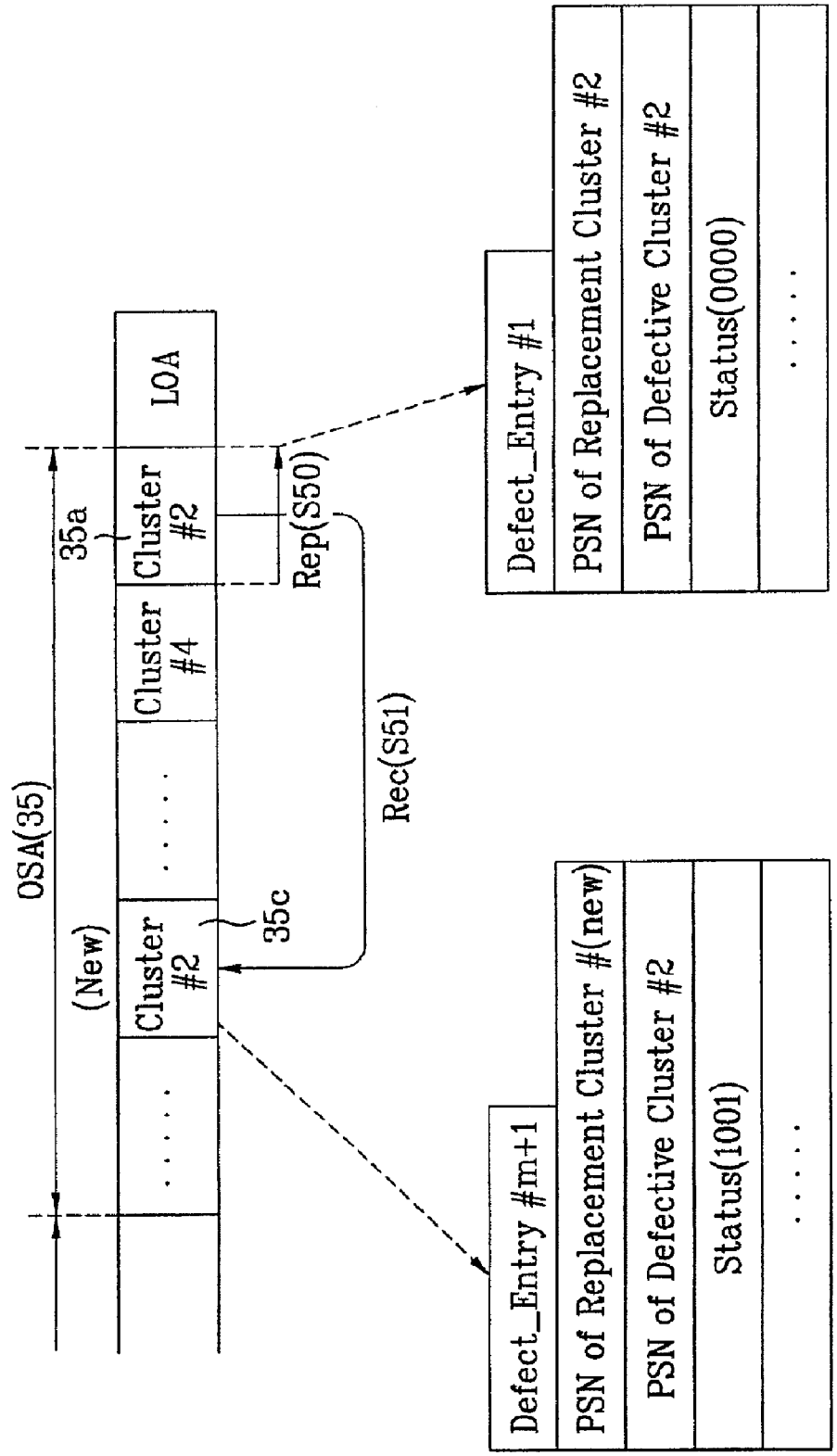

FIG. 6 is a diagram illustrating the process of managing defects in replacement areas according to an embodiment of the present invention. Referring to FIGS. 4-6, as an example, in the data writing operation when the second cluster of data (Cluster #2) is written onto a replacement area 35*a* within the OSA 35 due to a defect in the corresponding cluster area 32*a* of the user data area 32, the recording/reproducing device 20 writes TDFL information pertaining to Cluster #2 onto the TDFL area 33 as discussed above. This TDFL information contains a first defect entry (e.g., Defect_Entry #1) pertaining to Cluster #2, a physical sector number of the replacement area 35*a* (PSN of Replacement Cluster #2), a physical sector number of the second cluster area 32*a* having a defect (PSN of Defective Cluster #2), the status information of 'Status=0000', and so on.

Thereafter, if a new defect is detected in the middle of reproduction of the second cluster of data Cluster #2 written in the replacement area 35*a* of the OSA 35 according to the data reproduction operation (step S50), the second cluster of data Cluster #2 is written onto a second replacement area (e.g., area 35*c*) of the OSA 35 (step S51). The physical sector number of the second replacement area 35*c* (PSN of Replacement Cluster #2 (New)), the physical sector number of the second cluster area 32*a* of the user data area 32 having a defect (PSN of Defective Cluster #2), the status information of 'Status=1001' (indicating double replacements), etc. are written onto the TDFL area 33 as a (m+1)th defect entry (Defect_Entry #(m+1)). Any defect in the replacement/spare areas is managed in this manner.

When a data reproduction operation is carried out again, the second cluster of data written in the second replacement area 35*c* of the OSA 35 is read and reproduced based on the stored TDFL information of the (m+1)th defect entry while disregarding the TDFL information on the first defect entry written before. The status information of '1001' value included in the (m+1)th defect entry (Defect_Entry #(m+1)) indicates to the recording/reproducing device 20 to disregard the data obtained from using the previous defect entry (e.g., Defect_Entry #1).

In this manner, different status values can be designated to indicate priority of defect entries. As a mere example, the status information of '1101' value associated with a defective cluster area may mean that the recording/reproducing device 20 should disregard the next lower priority defect entry having the status information of '1001' value and associated with the same defective cluster area. That is, the status value of '1101' may indicate that a defect is present in the second replacement area and that the present replacement area is a third replacement area replacing the defective second replacement area of the OSA 35. Obviously, any value(s) can be used as the status information.

In one embodiment, if the flag information (e.g. 'Spare & TDFL Full Flag') in the TDDS indicates that the OSA 35 and the TDFL area 33 are full with data, then the recording/reproducing device 20 does not carry out, but omits any unnecessary defective area detecting and replacement writing operations. But if the OSA 35 and the TDFL area 33 are not full with data based on the flag information, the recording/reproducing device 20 continues with the defective area detecting and replacement writing operations. The defective area detecting and replacement writing operations can be stopped without a command for finalizing the data writing on the BD-WO, such as a 'Disc Finalize' command. Such a command to finalize the data writing on the BD-WO can be generated by the microcomputer 26. For instance, if the user data area 32 or an operator's selected user data is full, then the command to finalize the data writing on the BD-WO may be generated.

In another example, upon reception of the command for finalizing (finalize command) the data writing on the BD-WO, such as a 'Disc Finalize' command, in the middle of the defective area detecting and replacement writing operations, and if the flag information indicates that the OSA 35 and the TDFL area 33 are not full, then the recording/reproducing device 20 may keep performing the defective area detecting and replacement writing operations even though the recording/reproducing device 20 stops a general data writing operation (e.g., writing data into the user data area 32).

At the finalization (e.g., in response to the finalize command), the microcomputer 26 reads the TDDS information and the TDFL information written thus far in the areas 36*a* and 33, respectively, and writes them permanently onto the Defect Management Area (DMA) 36*c* in the LIA 36 as DMA information. That is, TDMA information composed of the TDDS information and the TDFL information is transferred onto the DMA 36*c* as DMA information composed of the DDS information and DFL information. The DDS information and DFL information correspond respectively to the TDDS and the TDFL information, but in the DDS information, the PSNs stored in the TDDS information are modified to correspond to the location(s) of the DFLs instead of the location(s) of the TDFLs.

The BD-WO may include a plurality of DMAs with the same DMA information stored in each of the DMAs, so that any loss or inaccurate reading of DMA information may be prevented in view of the duplicability of the DMA information from different DMAs. The first and second defect management areas DMA 1 and 2 may be assigned to the LIA, and third and fourth defect management areas DMA 3 and 4 may be assigned to the LOA. Accordingly, when a recording/reproducing device carries out a data reproduction operation, the data written in the replacement area(s) of the spare area, instead of the defective area(s) of the user data area, can be read and reproduced using the DDS information and the DFL information (DMA information) stored in any one of the DMAs.

Moreover, the data written in a subsequent replacement area due to any defect in the replacement areas can be read and reproduced properly using the status information in the defect entries (Defect Entrys).

Furthermore, any unnecessary defect detecting and replacement writing operations can be stopped automatically with reference to the flag information (Spare & TDFL Full Flag) included in the TDDS information and the like, if the spare area and the TDFL area are full.

Figure 7:
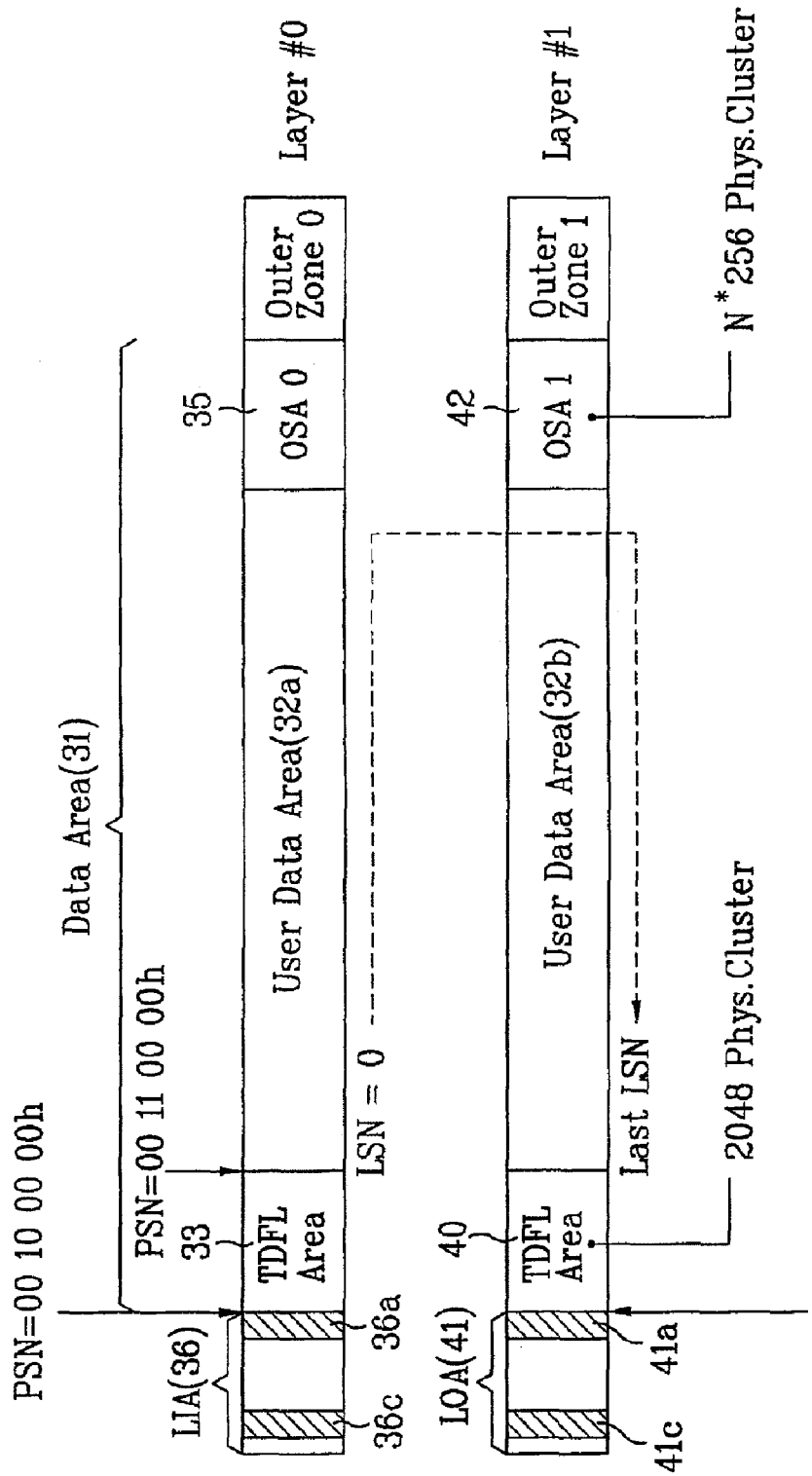
FIG. 7 illustrates a structure of a dual layer BD-WO having the present invention applied thereto.

FIG. 7 shows a structure of a dual layer BD-WO according to an embodiment of the present invention. Referring to FIG. 7, the BD-WO is a dual layer disc having a first layer (Layer #0) and a second layer (Layer #1). The first layer includes a LIA 36, a data area 31 and an outer zone area (Outer Zone 0), whereas the second layer includes a data area 31, an outer zone area (Outer Zone 1), and a LOA 41. Also, a first outer spare area (OSA 0) 35 and a second outer spare area (OSA1) 42 may be assigned to non-user data areas adjacent to the outer zone (Outer Zone 0) of the first layer and the outer zone (Outer Zone 1) of the second layer, respectively.

Applying the above-discussed concepts of the invention, a TDFL area may be located in a non-user data area 33 adjacent to the LIA 36 of the first layer, and a TDFL area may be located in a non-user data area 40 adjacent to the LOA 41 of the second layer. Since the data writing operation generally occur from the start of the user data area 32a of the first layer (indicated here as "LSN=0") to the end of the user data area 32b of the second layer (indicated here as "Last LSN") in the dotted arrow direction as shown, the TDFL areas 33 and 40 may be used sequentially or independently to store therein the TDFL information. If the TDFL areas 33 and 40 are sequentially used, then the second TDFL area 40 would not be used until the first TDFL area 33 is filled up. If the TDFL areas 33 and 40 are used independently, each TDFL area may be assigned to contain information directed to only one layer. For instance, the TDFL area 33 may contain information pertaining to only the first layer (Layer #0), and the TDFL area 40 may contain information pertaining to only the second layer (Layer #1).

Similarly, the LIA 36 and the LOA 41 may be used sequentially or independently to store therein the TDDS and/or DMA (DDS & DFL) information as discussed above. For instance, if the LIA 36 and the LOA 41 are sequentially used, then the second TDDS area 41a may not be used until the first TDDS area 36a is filled up. If the LIA 36 and the LOA 41 are used independently, for instance, the first TDDS area 36a may contain information pertaining to only the first layer (Layer #0), and the second TDDS area 41a may contain information pertaining to only the second layer (Layer #1).

Likewise, the first and second DMAs 36c and 41c may be used sequentially or independently. For instance, if the DMAs 36c and 41c are used sequentially, then the second DMA 41c would not be used until the first DMA 36c is filled up. If the DMAs 36c and 41c are used independently, then the first DMA 36c may contain DMA information pertaining only to the first layer (Layer #0) (which may be obtained from the first TDMA areas 33 and 36a and/or the second TDMA areas 40 and 41a) or may contain DMA information entirely corresponding to the information stored in the first TDMA areas 33 and 36a. In the same case, the second DMA 41c may contain DMA information pertaining only to the second layer (Layer #1) (which may be obtained from the first TDMA areas 33 and 36a and/or the second TDMA areas 40 and 41a), or may contain DMA information entirely corresponding to the information stored in the second TDMA areas 40 and 41a. Other variations are possible.

Each TDFL area may have a recording size equivalent to 2048 physical clusters, and each OSA may have a recording size equivalent to multiple of 256 physical clusters.

Figure 8:
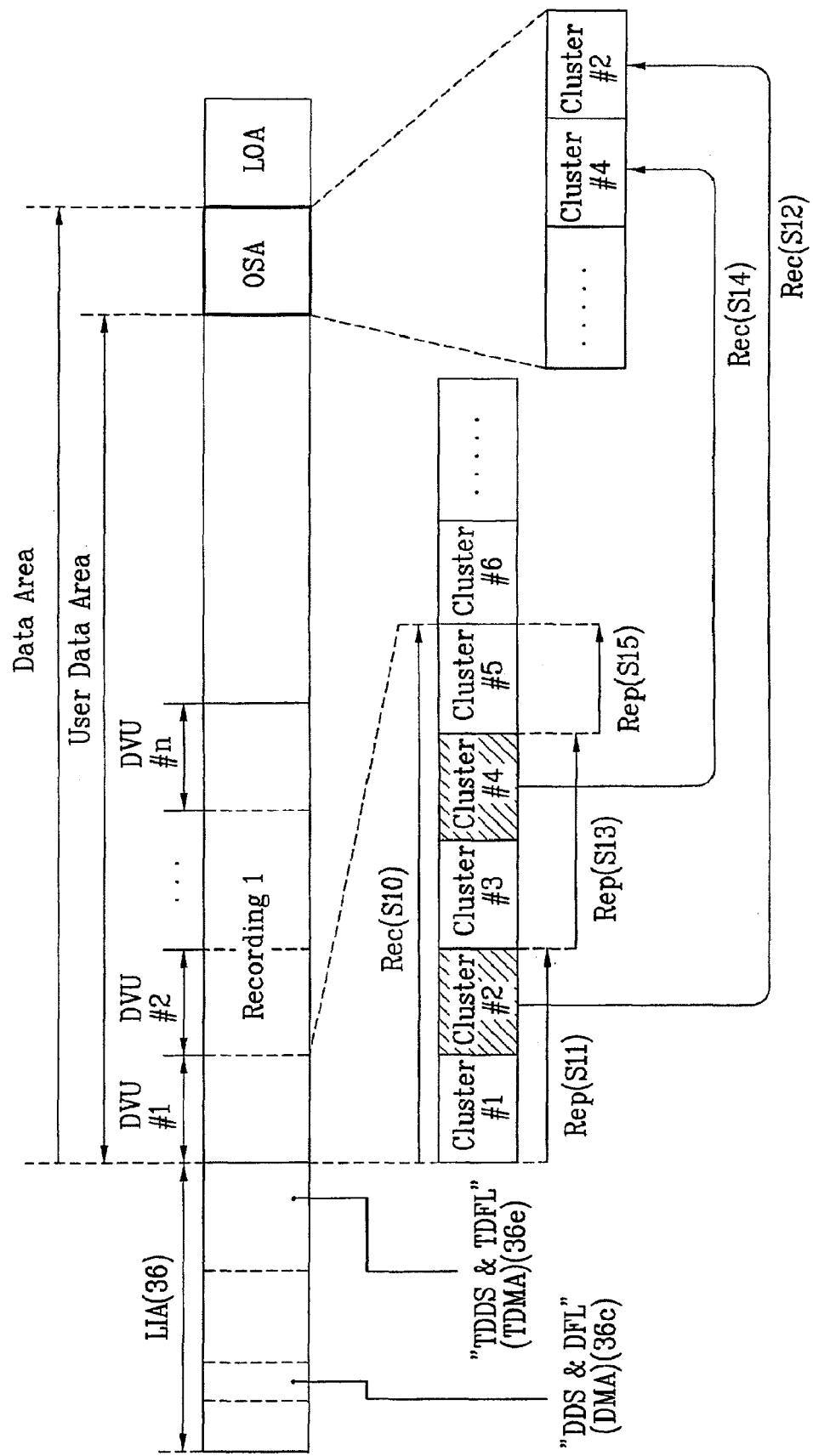
FIG. 8 illustrates a structure of a BD-WO and a diagram illustrating a method for managing a defective area on the BD-WO in accordance with another preferred embodiment of the present invention.

FIG. 8 show a structure of a BD-WO and a diagram for illustrating a method of managing defective areas on the BD-WO according to another preferred embodiment of the present invention. This embodiment is identical to the embodiment shown in FIGS. 4-6 above, except that both the TDFL information and the TDDS information are now written in a particular sector in front/behind of the data area, for example, in the LIA.

For example, referring to FIG. 8, the LIA 36 includes a DMA 36c for storing therein the DMA information composed of the DDS and DFL information, and a TDMA area 36e for storing therein the TDMA information composed of the TDDS and TDFL information. Other data may be also stored in the LIA 36.

This concept of the FIG. 8 embodiment is equally applicable to a BD-WO having a plurality of recording layers. For example, the embodiment of FIG. 8 is equally applicable to the dual layer BD-WO structure shown in FIG. 7. In that case, the structure of the dual layer BD-WO having DMA and TDMA information as discussed above in reference to FIG. 7 can be modified such that the TDFL areas can be located within the LIA and/or LOA of the dual layer BD-WO, in stead of being located within the data areas (33, 40) of the first and second layers. All other concepts associated with the FIG. 7 embodiment can apply herein.

In the present invention, the data reproducing operation can occur currently, subsequently or prior to the data writing operation. The data writing operation can occur currently, subsequently or prior to the defect detecting operation and/or data replacement writing operation and/or the management information writing operation. Also in the present invention, the order in which the DDS area, DFL area, TDDS area, and the TDFL area are allocated within the LIA and LOA may vary. For instance, in FIG. 4, the TDDS area 36a may precede the DMA 36c in the LIA 36.

As has been described, the method and apparatus for managing a defective area on a recording medium of write-once type permit reading and/or reproducing of data written on a defective area of the recording medium such as BD-WO, properly by writing the data on a spare area in lieu of the defective area and managing the temporary management data, effectively. In addition, the method and apparatus can read and reproduce the data written in other replacement areas when the first replacement area is found to be defective, using status information in a defect entry. The method and apparatus can stop unnecessary defect detecting and/or replacement writing operations if the spare area (replacement area) and the TDFL area are indicated as full based on flag information stored in TDDS information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. An apparatus for managing a defective area on a recording medium of writable once type, the recording medium including a lead-in area having a defect management area and a data area having a user data area and a spare area, the apparatus comprising:
a pickup configured to write/reproduce data on/from the recording medium;
a servo configured to control the pickup to maintain a distance between an objective lens of the pickup and the recording medium, and to track a relevant track of the recording medium;
a data processor configured to process and supply input data to the pickup for writing, or process data read from the recoding medium;

a memory configured to store information associated with the recording medium; and a controller configured to operatively coupled to above components—the pickup, the servo, the data processor and the memory, and control the components so that the apparatus writes, onto a temporary management area located in the lead-in area, management information pertaining to the defective area and access information for accessing the management information, where the management information includes location information indicating locations of the defective area and a replacement area corresponding to the defective area and included in the spare area, and the access information includes location information indicating a location of the management information written in the temporary management area;

performs no more defect management operation when the temporary management area is full; and when finalizing the recording medium, writes onto the defect management area the management and access information written in the temporary management area, wherein when writing the access information onto the defect management area the apparatus modifies the access information to include location information indicating a location of the management information written in the defect management area instead of the location of the management information written in the temporary management area.

2. The apparatus as claimed in claim 1, wherein the controller is configured to control the components so that the apparatus finalizes the recoding medium when the user data area is full.

3. The apparatus as claimed in claim 2, wherein the controller is configured to control the components so that the apparatus further writes, onto the temporary management area, flag information indicating whether the spare area is full.

4. The apparatus as claimed in claim 3, wherein when the flag information indicates that the spare area is full, the controller is configured to control the components so that the apparatus performs no more defect management operation.

5. The apparatus as claimed in claim 4, wherein the controller is configured to control the components so that the apparatus writes, onto the temporary management area, information indicating whether the temporary management area is full.

6. The apparatus as claimed in claim 5, wherein when the information indicating whether the temporary management area is full indicates that the temporary management area is full, the controller is configured to control the components so that the apparatus performs no more defect management operation.

7. The apparatus as claimed in claim 1, wherein the recording medium has a first recording layer having a first temporary management area and a second recording layer having a second temporary management area, where the controller is configured to control the components so that the apparatus uses the first and second temporary areas sequentially.

8. The apparatus as claimed in claim 7, wherein the controller is configured to control the components so that the apparatus performs no more recording operation when all temporary management areas within the recording medium are full.

9. An apparatus for managing a defective area on a recording medium of writable once type, the recording medium including a lead-in area having a defect management area and a data area having a user data area and a spare area, the apparatus comprising:

a pickup configured to record data on the recording medium; and a controller operatively coupled to the pickup and configured to control the pickup, where the controller is configured to control the pickup to write, onto a temporary management area located in the recording medium, management information pertaining to the defective area and access information accessing the management information, where the management information includes location information indicating locations of the defective area and a replacement area corresponding to the defective area, the replacement area included in the spare area, and the access information includes location information indicating a location of the management information written in the temporary management area;

control the pickup to perform no more defect management operation when the temporary management area is full; and when finalizing the recording medium, control the pickup to write onto the defect management area the management and access information written in the temporary management area, wherein when writing the access information written in the temporary management area onto the defect management area the controller is configured to modify the access information written in the temporary management area to include location information indicating a location of the management information written in the defect management area instead of the location of the management information written in the temporary management area.

10. The apparatus as claimed in claim 9, wherein the controller is configured to finalize the recording medium when the user data area is full.

11. The apparatus as claimed in claim 10, wherein the controller is configured to control the pickup to further write, onto the temporary management area, flag information indicating whether the spare area is full.

12. The apparatus as claimed in claim 11, wherein the controller is configured not to perform defect management operation to the recording medium when the flag information indicates that the spare area is full.

13. The apparatus as claimed in claim 12, wherein the controller is configured to control the pickup to further write, onto the temporary management area, information indicating whether the temporary management area is full.

14. The apparatus as claimed in claim 13, wherein the controller is configured not to perform defect management operation to the recording medium when the information indicates that the temporary management area is full.

15. The apparatus as claimed in claim 9, wherein the recording medium has a first recording layer having a first temporary management area and a second recording layer having a second temporary management area, wherein the controller is configured to use the first and second temporary areas sequentially.

16. The apparatus as claimed in claim 15, wherein the controller is configured to control the components so that the apparatus performs no more recording operation when all temporary management areas within the recording medium are full.

17. A recording medium of writable once type, comprising:
first and second recording areas, each of the first and second recording areas including a lead-in area having a defect management area and a data area having a user data area and a spare area;
a temporary management area including first and second temporary management areas storing therein management information pertaining to a defective area and access information for accessing the management information until finalizing the recording medium, where the management information includes location information indicating locations of the defective area and a replacement area corresponding to the defective area, the replacement area included in the spare area, and the access information includes location information indicating a location of the management information stored in the temporary management area, wherein when the temporary management area is full, no more defect management operation is performed; and
the defect management area for storing management and access information written thereto from the temporary management area when finalizing the recording medium, where the access information stored in the defect management area includes location information indicating a location of the management information stored in the defect management area other than the temporary management area.

18. The recording medium as claimed in claim 17, wherein the locations of the defective and replacement areas are represented as physical sector numbers.

19. The recording medium as claimed in claim 18, wherein the temporary management area further stores flag information indicating whether the spare area is full.

20. The recording medium as claimed in claim 19, wherein the temporary management area further stores information indicating whether the temporary management area is full.

21. The recording medium as claimed in claim 17, wherein the first recording layer includes the first temporary management area and the second recording layer includes the second temporary management area.

22. The recording medium as claimed in claim 21, wherein no more recording operation is performed when all temporary management areas within the recording medium are full.

23. An apparatus for reproducing data from a recording medium of writable once type, the recording medium including a lead-in area having defect management area and a data area having a user data area and a spare area, the apparatus comprising:
a pickup configured to reproduce data from the recording medium;
a servo configured to control the pickup to maintain a distance between an objective lens of the pickup and the recording medium, and to track a relevant track of the recording medium;
a data processor configured to process and supply input data to the pickup for writing, or process data read from the recoding medium;
a memory configured to store information associated with the recording medium; and
a controller configured to operatively coupled to above components—the pickup, the servo, the data processor and the memory, and control the components so that before the recording medium is finalized, the apparatus reproduces access information from a temporary management area located in the lead-in area of the recoding medium for accessing management information written in the temporary management area, the access information including location information indicating a location of the management information written in the temporary management area; reproduces the management information from the temporary management area based on the access information; and reproduces, instead of data written in a defective area, data written in a replacement area included in the spare area based on the management information reproduced from the temporary management area; and
the controller configured to control the components so that after the recording medium has been finalized, the apparatus reproduces modified access information written in the defect management area, the modified access information modified from the access information written in the temporary management area and written into the defect management area when finalizing the recording medium, the modified access information including location information indicating a location of management information written into the defect management area from the temporary management area when finalizing the recording medium; reproduces the management information written in the defect management area based on the modified access information; and reproduces, instead of the data written in the defective area, the data written in the replacement area based on the management information reproduced from the defect management area.

24. The apparatus as claimed in claim 23, wherein the controller is configured to control the components so that before the recording medium is finalized the apparatus reproduces, from the temporary management area, flag information indicating whether the spare area is full.

25. The apparatus as claimed in claim 24, wherein the controller is configured to control the components so that before the recording medium is finalized the apparatus reproduces flag information indicating whether the temporary management area is full from the temporary management area.

26. An apparatus for reproducing data from a recording medium of writable once type, the recording medium including a lead-in area having a defect management area and a data area having a user data area and a spare area, the apparatus comprising:
a pickup configured to reproduce data from the recording medium; and
a controller operatively coupled to the pickup and configured to control the pickup, where the controller is configured to before the recording medium is finalized, control the pickup to reproduce access information from a temporary management area located in the lead-in area of the recoding medium for accessing management information written in the temporary management area, the access information including location information indicating a location of the management information written in the temporary management area; control the pickup to reproduce the management information from the temporary management area based on the access information; and control the pickup to reproduce, instead of data written in a defective area, data written in a replacement area included in the spare area based on the management information reproduced from the temporary management area; and after the recording medium has been finalized, control the pickup to reproduce modified access information written in the defect management area, the modified access information modified from the access information written in the temporary management area and written into the defect management area when finalizing the recording medium, the modified access information including location information indicating a location of management information written into the defect management area from the temporary management area when finalizing the recording medium; control the pickup to reproduce the management information written in the defect management area; and control the pickup to reproduce, instead of the data written in the defective area, the data written in the replacement area based on the management information reproduced from the defect management area.

27. The apparatus as claimed in claim 26, wherein before the recording medium is finalized the controller is configured to control the pickup to reproduce flag information indicating whether the spare area is full from the temporary management area.

28. The apparatus as claimed in claim 27, wherein before the recording medium is finalized the controller is configured to reproducing flag information indicating whether the temporary management area is full from the temporary management area.

* * * * *